(12) United States Patent
Song et al.

(10) Patent No.: US 12,474,505 B2
(45) Date of Patent: Nov. 18, 2025

(54) META-OPTICS AND ELECTRIC DEVICE INCLUDING THE SAME

(71) Applicants: SAMSUNG ELECTRONICS CO., LTD., Suwon-si (KR); The Board of Trustees of the Leland Stanford Junior University, Stanford, CA (US)

(72) Inventors: Jung-Hwan Song, Stanford, CA (US); Mark L. Brongersma, Stanford, CA (US); Junghyun Park, Seoul (KR)

(73) Assignees: SAMSUNG ELECTRONICS CO., LTD., Suwon-si (KR); The Board of Trustees of the Leland Stanford Junior University, Stanford, CA (US)

( * ) Notice: Subject to any disclaimer, the term of this patent is extended or adjusted under 35 U.S.C. 154(b) by 552 days.

(21) Appl. No.: 17/959,836

(22) Filed: Oct. 4, 2022

(65) Prior Publication Data

US 2023/0103982 A1    Apr. 6, 2023

Related U.S. Application Data

(60) Provisional application No. 63/252,897, filed on Oct. 6, 2021.

(30) Foreign Application Priority Data

Oct. 13, 2021    (KR) .................. 10-2021-0136160

(51) Int. Cl.
    *G02B 6/124*    (2006.01)
    *G02B 1/00*    (2006.01)
    *G02B 6/122*    (2006.01)

(52) U.S. Cl.
    CPC .......... *G02B 1/002* (2013.01); *G02B 6/1221* (2013.01); *G02B 6/124* (2013.01)

(58) Field of Classification Search
    None
    See application file for complete search history.

(56) References Cited

U.S. PATENT DOCUMENTS

2019/0018299 A1    1/2019    Park et al.
2020/0049997 A1    2/2020    Song et al.
(Continued)

FOREIGN PATENT DOCUMENTS

CN    111722310 A    9/2020

OTHER PUBLICATIONS

Hu, Jigang, et al., "Dual-band total absorption via guided-mode resonance in a monolayer MoS2 covered dielectric grating structure," Proceedings of SPIE, vol. 10823 108230T-2, Oct. 25, 2018, (7 total Pages).

(Continued)

*Primary Examiner* — Chad H Smith
(74) *Attorney, Agent, or Firm* — Sughrue Mion, PLLC

(57) ABSTRACT

Provided is a meta-optics including a waveguide layer including a first surface and a second surface opposite to the first surface; and a plurality of meta units provided on the waveguide layer, each meta unit of the plurality of meta units including a grating configured to diffract incident light of a predetermined wavelength, a first electrode provided under the grating, a dielectric layer provided over the grating, and a second electrode provided on the dielectric layer, wherein a dielectric constant of the grating and a reflectance of the grating with respect to incident light change based on a voltage applied to the first electrode and the second electrode.

19 Claims, 24 Drawing Sheets

(56) References Cited

U.S. PATENT DOCUMENTS

2020/0103697 A1* 4/2020 Tan ................. G02F 1/133514
2021/0397128 A1* 12/2021 Hirose ................. G02F 1/292

OTHER PUBLICATIONS

Zhendong Yan, et al., "Gaphene ultraviolet ultrahigh-Q perfect absorption for nanoscale optical sensing," Optics Express., vol. 28, No. 5, Mar. 2, 2020, vol. 28, Issue 5, pp. 6095-6101, (7 total pages).
Yonghwi Kim, et al., "Phase Modulation with Electrically Tunable Vanadium Dioxide Phase-Change Metasurfaces," American Chemical Society, Nano Letters, 19, May 28, 2019. 8 Total Pages.

* cited by examiner

META-OPTICS AND ELECTRIC DEVICE INCLUDING THE SAME

CROSS-REFERENCE TO RELATED APPLICATIONS

This application is based on and claims priority under 35 U.S.C. § 119 to Korean Patent Application No. 10-2021-0136160, filed on Oct. 13, 2021 in the Korean Intellectual Property Office, and U.S. Provisional Application No. 63/252,897, filed on Oct. 6, 2021 in the U.S. Patent and Trademark Office, the disclosures of which are incorporated by reference herein in their entirety.

BACKGROUND

1. Field

Example embodiments of the present disclosure relate to a meta-optics and electronic devices including the same.

2. Description of Related Art

A metasurface includes artificial metastructures patterned in any size and shape smaller than a wavelength. Each metastructure in the metasurface shows properties in response to electromagnetic waves or sound waves applied to the metasurface. The metasurface may modulate the reflection phase or transmission phase of light, and thus, may be used as a light modulator.

To construct a phase modulation array, a refractive index modulating material with large optical loss has been used, and in view of the structural characteristics of related art, there is a disadvantage in that the absorption loss of such material is large. Accordingly, efficient modulation is difficult due to a relatively low Q-factor.

In related art, vanadium dioxide (VO2), which is one of the phase change materials for metal antennas, is used as a phase change material. In this case, a current is applied to a gold (Au) antenna to change the phase of VO2, and the phase is modulated is this manner. However, because a metal reflector is used in related art, a great amount of optical absorption occurs, and as a result, the Q factor of the resonator is lowered. For example, the Q factor (resonance wavelength/full width at half-maximum (FWHM)) may range from about 5 to about 20. The Q factor in related art is relatively small, and the maximum modulation phase at the resonance wavelength has a relatively small range of about 180 degrees.

SUMMARY

One or more example embodiments provide meta-optics that modulates light non-mechanically, and may have excellent performance.

One or more example embodiments also provide a method of manufacturing meta-optics that includes a method of manufacturing meta-optics including an active element.

Additional aspects will be set forth in part in the description which follows and, in part, will be apparent from the description, or may be learned by practice of example embodiments.

According to an example embodiment, a meta-optics includes: a waveguide layer including a first surface and a second surface opposite to the first surface; and a plurality of meta units provided on the waveguide layer, each meta unit of the plurality of meta units including a grating configured to diffract incident light of a predetermined wavelength, a first electrode provided under the grating, a dielectric layer provided over the grating, and a second electrode provided on the dielectric layer, wherein a dielectric constant of the grating and a reflectance of the grating with respect to incident light change based on a voltage applied to the first electrode and the second electrode.

A permittivity of the grating may change based on a change in an exciton density of the grating, and the voltage may have a magnitude that generates an exciton resonance of the grating.

The gratings of the plurality of meta units may be spaced apart from each other in a first direction, and the waveguide layer may be configured such that the light diffracted by the grating is reflected between the first surface and the second surface to cause guided mode resonance toward the first direction in which the grating is arranged.

The plurality of meta units may be arranged in the first direction and in a second direction perpendicular to the first direction.

The light may include light of a first wavelength that is an exciton absorption wavelength of a material included in the grating and a guided mode resonance wavelength, and a period of the grating may be less than the first wavelength to block a high order mode diffraction.

A guided mode resonance wavelength may be blue-shifted based on light of a second wavelength that is greater than the first wavelength being incident, and the guided mode resonance wavelength may be red-shifted based on light of a third wavelength that is less than the first wavelength being incident.

The grating may include at least one of graphene, transition metal dichalcogenide (TMDc), and a two-dimensional semiconductor material, and a wavelength of the light may be about 10 nm to about 3,000 μm.

The grating may include tungsten disulfide (WS2), and a wavelength of the light may be about 600 nm to about 630 nm.

A voltage may be independently applied to each meta unit of the plurality of meta units through the first electrode and the second electrode of each meta unit of the plurality of meta units.

At least one of a reflectance of the incident light and a transmittance of the incident light in a case where a voltage is applied may be different by about 20% or more from a reflectance of the incident light and a transmittance of the incident light, respectively, in a case where a voltage is not applied.

A Q factor of the meta-optics may be at least 100.

The first electrode or the second electrode may include at least one of indium tin oxide (ITO), aluminum zinc oxide (AZO), indium zinc oxide (IZO), and indium gallium zinc oxide (IGZO), and the waveguide layer may include at least one of silicon oxide (SiO$_2$), hafnium oxide (HfO$_2$), titanium oxide (TiO$_2$), and aluminum oxide (Al$_2$O$_3$).

The second electrode of a meta unit among the plurality of meta units may be provided adjacent to an upper surface and a side surface of the grating included in the meta unit and extends along the waveguide layer.

The waveguide layer may be in a form of at least one of a slab, a ridge, a channel, a strip-loaded, a buried, or a photonic crystal.

The meta-optics may be electrically tunable.

According to an aspect of an example embodiment, a meta-optics includes: a waveguide layer; and a plurality of meta units provided on the waveguide layer, each meta unit of the plurality of meta units including a grating that includes a two-dimensional material, and an active element configured to apply a stimulus to the grating, wherein the gratings of the plurality of meta units are spaced apart from each other, and wherein a dielectric constant of the grating and a reflectance of the grating with respect to the incident light change based on the stimulus applied by the active element to the grating.

The active element may be configured to generate an exciton resonance in the two-dimensional material, and the active element may include at least one of an electrical gating structure, an optical stimulation structure, a chemical reaction structure, a magnetic field application structure, a heating structure, or a mechanical deformation structure.

The plurality of meta units may be respectively configured to receive the stimulus independently by the active element included in each of the plurality of meta units.

At least one of a reflectance of the light or a transmittance of the light may change by about 20% or more based on the active element being stimulated, and a Q factor of the meta-optics may be at least 100.

According to an aspect of an example embodiment, an electronic device includes: a meta-optics including: a waveguide layer including a first surface and a second surface opposite to the first surface; and a plurality of meta units provided on the waveguide layer, each meta unit of the plurality of meta units including a grating configured to diffract incident light of a predetermined wavelength, a first electrode provided under the grating, a dielectric layer provided over the grating, and a second electrode provided on the dielectric layer, wherein a dielectric constant of the grating and a reflectance of the grating with respect to incident light change based on a voltage applied to the first electrode and the second electrode.

BRIEF DESCRIPTION OF THE DRAWINGS

The above and/or other aspects, features, and advantages of example embodiments will be more apparent from the following description taken in conjunction with the accompanying drawings, in which.

DETAILED DESCRIPTION

Figure 1:
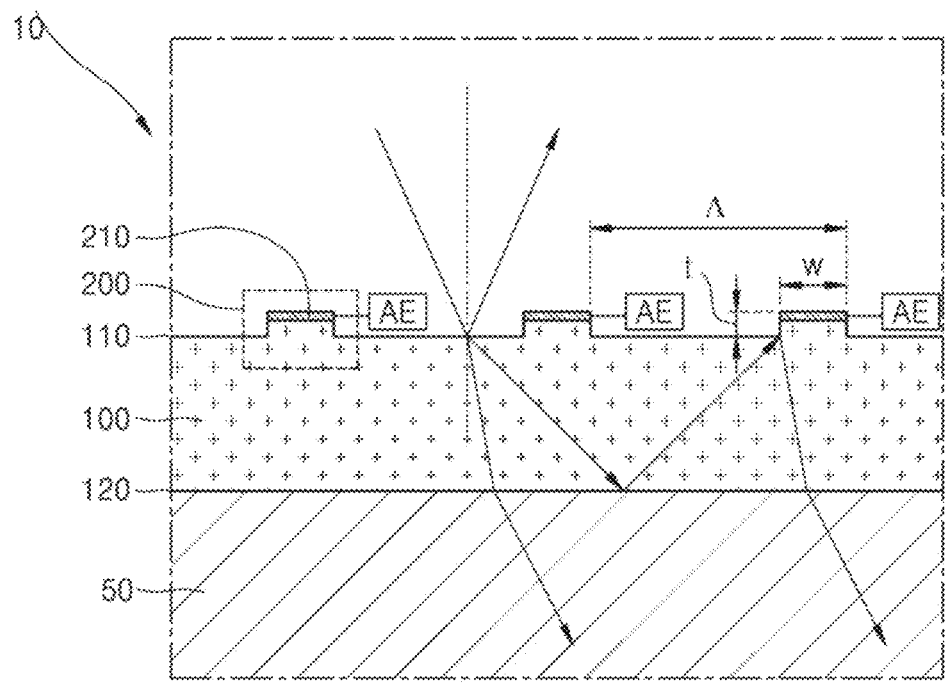
FIG. 1 is a cross-sectional view illustrating a meta-optics according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, example embodiments will be described in detail with reference to the accompanying drawings. The example embodiments described below are merely exemplary, and various modifications are possible from these embodiments. In the following drawings, the same reference numerals refer to the same components, and the size of each component in the drawings may be exaggerated for clarity and convenience of description.

Hereinafter, what is described as "upper part" or "on" may include not only those directly above by contact, but also those above non-contact. Likewise, what is written as "below" or "under" may include those directly below in contact as well as below in non-contact.

The terms of a singular form may include plural forms unless otherwise specified. In addition, when a certain part "includes" a certain component, it means that other components may be further included rather than excluding other components unless otherwise stated.

The use of the term "the" and similar designating terms may correspond to both the singular and the plural.

The meaning of "connection" may include not only a physical connection, but also an optical connection, an electrical connection, and the like.

In addition, the use of all exemplary terms (e.g., etc.) is merely for describing the technical idea in detail, and unless it is limited by the claims, the scope of rights is not limited by these terms.

Terms such as first, second, etc. may be used to describe various components, but the components should not be limited by the terms. The terms are used only for the purpose of distinguishing one component from another.

The fact that the length units such as height, depth, and thickness are substantially the same or identical may include differences within an error range recognized by those skilled in the art.

The term "and/or" may include any combination including one or more of the listed elements. Also, for example, the expression "at least one of A, B, or C" includes one A, one B, one C, two including A and B, two including A and C, two including B and C, or all including A, B, and C.

The two-dimensional material is a material in which atoms of several nanometers are arranged in one layer, that is, may refer to a crystalline material composed of one layer of atoms.

Meta-optics may refer to an optical element including a metasurface.

The line (on-exc.) of exciton on in the drawing may refer to a state in which exciton absorption is possible, or a state in which exciton resonance is possible, and a line (off-exc.) of exciton off in the drawing may refer to a state in which exciton absorption is suppressed or a state in which exciton resonance is suppressed.

Figure 2:
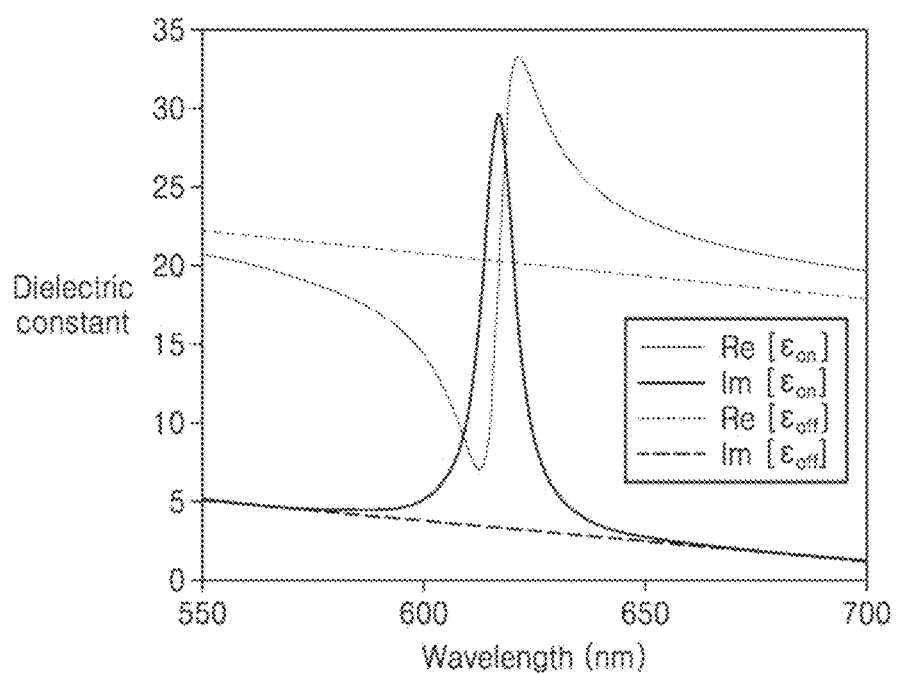
FIG. 2 is a graph showing the real part and the imaginary part of a dielectric constant according to the exciton resonance state of tungsten disulfide ($WS_2$) that varies with the wavelength.
Figure 3A:
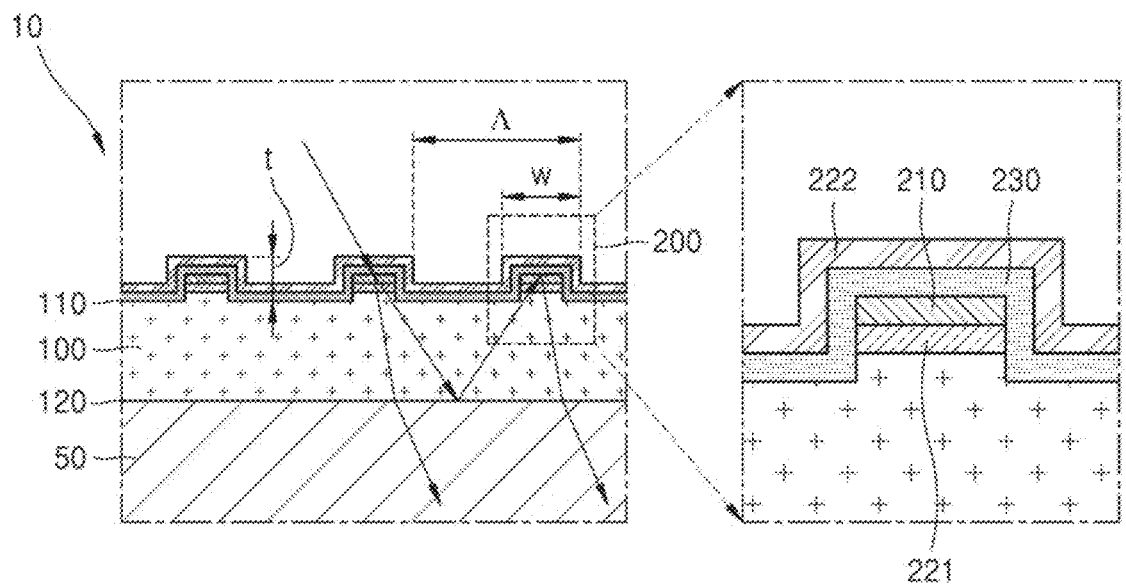
FIG. 3A is a cross-sectional view illustrating a meta-optics according to an example embodiment.
Figure 3B:
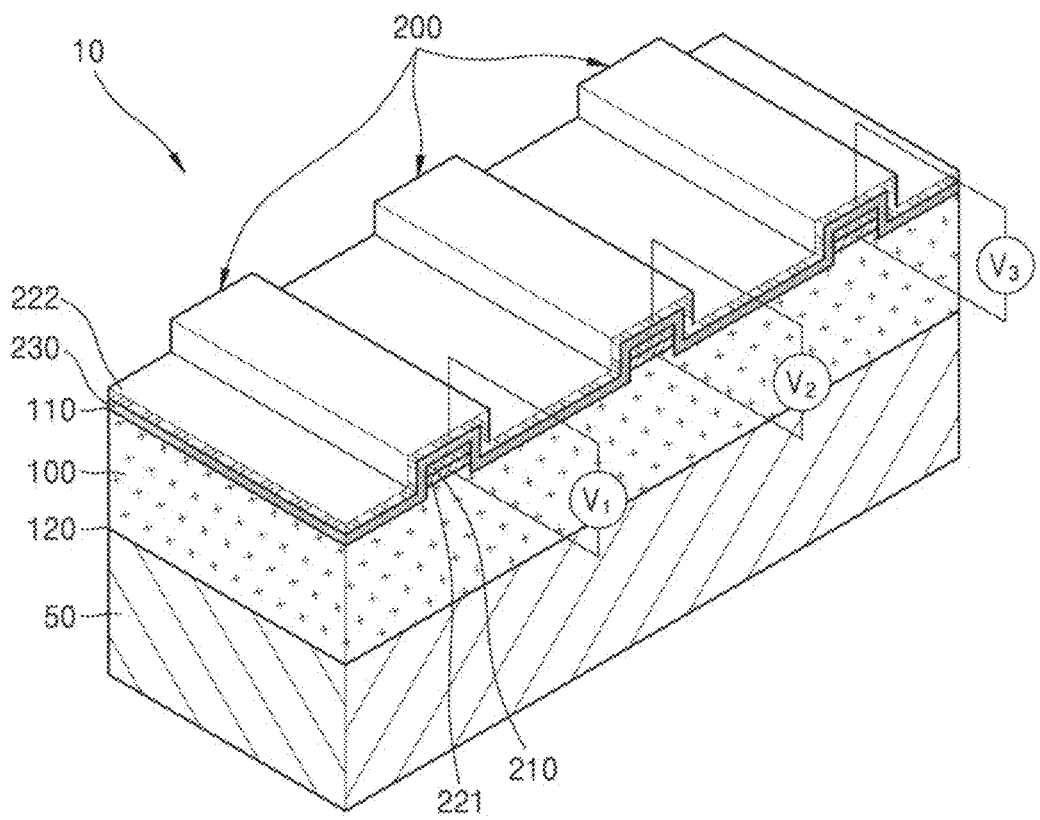
FIG. 3B is a perspective view of the meta-optics of FIG. 3A.

FIG. 1 is a cross-sectional view showing meta-optics according to an example embodiment, and FIG. 2 is a graph of a real part and an imaginary part of a dielectric constant according to an exciton resonance state of tungsten disulfide $WS_2$ that varies according to a wavelength. FIG. 3A is a cross-sectional view of the meta-optics according to an example embodiment, and FIG. 3B is a perspective view of the meta-optics of FIG. 3A.

The meta-optics 10 according to an example embodiment includes a waveguide layer 100 and a plurality of meta units 200 each including a grating 210 arranged on the waveguide layer 100 and diffracting incident light of a predetermined wavelength and an active element AE for applying a stimulus to the grating 210. By applying a stimulus to each grating 210 corresponding to each active element AE by each active element AE, the permittivity of each grating 210 may be changed, and accordingly, the reflectance of each grating 210 with respect to the incident light may be changed. For example, the active element AE may generate exciton resonance in a two-dimensional material, and the change in permittivity of the grating 210 may be due to a change in exciton density of the grating 210. The active element AE of the meta-optics 10 according to an example embodiment may include a first electrode 221 arranged under the grating 210, a dielectric layer 230 arranged over the grating 210, and a second electrode 222 arranged over the dielectric layer 230. A voltage may be independently applied to each of the plurality of meta units 200 or the grating 210 included in each of the plurality of meta units 200 through the first electrode 221 and the second electrode 222 included in each of the plurality of meta units 200 (or corresponding to each of the plurality of meta units 200). By the grating 210 that is stimulated by the active element AE, for example, by the grating 210 to which a voltage is applied through the first electrode 221 and the second electrode 222, the properties (e.g., reflectance or transmittance) of the meta-optics 10 may vary. For example, when the grating 210 receives a stimulus from the outside, it may be determined whether there is exciton resonance of the material including the grating 210, and accordingly, the exciton density may change, and the properties of the meta-optics 10 may change. By including the active element AE, the meta-optics 10 according to an example embodiment may be implemented as an active device configured to modulate incident light. For incident light of the same wavelength, a meta-optics 10, which is an active device including an active element AE may provide different outputs or different modulation characteristics than a meta-optics, which is a passive device that does not include the active elements AE. The meta-optics 10 according to an example embodiment may include an active structure configured to change the properties of the meta-optics 10 by applying a stimulus to the grating 210, and may provide an optical element including a metasurface, that is, the meta-optics 10, which may have a relatively large change in the characteristics, a wide modulation range of light, operate at a relatively high speed, and provide a relatively high Q-factor.

Referring to FIG. 1, the meta-optics 10 according to an example embodiment may include a substrate 50. The substrate 50 may include a dielectric material or a semiconductor material, for example, silicon dioxide ($SiO_2$), but is not limited thereto. A waveguide layer 100 may be arranged on the substrate 50. The substrate 50 may remain after the meta-optics 10 manufacturing process. However, embodiments are not limited thereto, and the substrate 50 is used only in the manufacturing process of the meta-optics 10, and may be removed after the meta-optics 10 is manufactured. The substrate 50 may include a light-transmitting material having a relatively high transmittance in a predetermined wavelength band, for example, a transmittance of about 85% or more. The wavelength of the incident light may be included in the predetermined wavelength range, and for example, if the incident light is in the visible range, the substrate 50 may include a light-transmitting material having a transmittance of about 85% or more in the visible light range, or may include a transparent material. Incident light of the visible light range is merely an example, and not limited thereto, and incident light of deep UV to terahertz (THz) may be used. For example, the wavelength of the incident light may be about 10 nm to about 3000 μm.

The meta-optics 10 according to an example embodiment may include a waveguide layer 100. The waveguide layer 100 may include an insulating material (dielectric material), and may form an optical waveguide in which incident light travels in a guided mode. The waveguide layer 100 may include a first surface 110 on the waveguide layer 100 in contact with another medium, and may include a second surface 120 under the waveguide layer 100. The first surface 110 and the second surface 120 may face each other. The first surface 110 may indicate an upper surface of the waveguide layer 100. The second surface 120 may refer to a surface located under the waveguide layer 100, and may be a surface in contact with another medium arranged under the waveguide layer 100. When the meta unit 200 includes the substrate 50, the second surface 120 may be an interface between the waveguide layer 100 and the substrate 50. According to another example embodiment, when the substrate 50 is removed from the formed meta unit 200, the second surface 120 may be an interface between the waveguide layer 100 and another medium such as air.

Light in the waveguide layer 100 may be reflected from the first surface 110 and the second surface 120, and through this, light may resonate in a guided mode inside the waveguide layer 100 and may be guided in the lateral direction of the waveguide layer 100. In this case, the lateral direction may be a direction perpendicular to the thickness direction of the waveguide layer 100, or a direction parallel to the first direction in which the plurality of meta units 200 are arranged.

Through the first surface 110, light may be incident into the waveguide layer 100 from the first medium positioned on the waveguide layer 100. Light incident on the first surface 110 from the first medium may be refracted or diffracted. The refracted light may travel at a different angle from the diffracted light based on a normal line. According to another example embodiment, light traveling from the first medium toward the waveguide layer 100 may be reflected from the first surface 110. Light incident on the first surface 110 in the waveguide layer 100 may be reflected or diffracted by the first surface 110 or may be refracted and transmitted through the first medium. The diffracted light may travel at a different angle from the refracted light based on a normal line. Light incident on the second surface 120 in the waveguide layer 100 may be refracted and incident on a second medium positioned below the waveguide layer 100. According to another example embodiment, light incident on the second surface 120 may be reflected back into the waveguide layer 100 toward the first surface 110. Light diffracted by the waveguide layer 100 may be reflected from the first surface 110 and the second surface 120 to be guided in the first direction.

The waveguide layer 100 may include a light-transmitting material having a relatively high transmittance in a predetermined wavelength band, for example, a transmittance of about 85% or more. The predetermined wavelength range may include a wavelength of incident light, and for example, when the incident light is in the visible range, the waveguide layer 100 may include a light-transmitting material having a transmittance of about 85% or more in the visible light range, or a transparent material. Incident light of the visible light range is merely an example, and not limited thereto, and incident light of deep UV to terahertz (THz) may be used.

The waveguide layer 100 may include an insulating material (dielectric material). The waveguide layer 100 may include at least one of an insulating silicon compound and an insulating metal compound. For example, the waveguide layer 100 may include at least one of silicon dioxide ($SiO_2$), hafnium oxide ($HfO_2$), titanium oxide ($TiO_2$), aluminum oxide ($Al_2O_3$), and silicon nitride ($Si_3N_4$). The refractive index of the material included in the waveguide layer 100 may be greater than 1, and may be greater than the refractive index of the substrate 50.

The light incident on the waveguide layer 100 may resonate in a guided mode and may be guided in the lateral direction of the waveguide layer 100, and the waveguide layer 100 may form an optical waveguide. The optical waveguide may have the form of, for example, a slab, a ridge, a channel, a strip-loaded, a buried, or a photonic crystal. The light may pass through the first surface 110 or the second surface 120 while resonating in the guided mode along the waveguide to be incident on the first medium or the second medium. For example, light may be guided inside the optical waveguide and then pass through the second surface 120 to be transmitted to the substrate 50, and here, the substrate 50 may be the second medium. A component of light transmitted to the medium through resonance in the interior and a component of light directly transmitted into the medium without diffraction may cause interference with each other, and transmission and reflection spectra may change depending on whether the interference is destructive or constructive. A detailed description thereof will be provided later.

The meta-optics 10 according to an example embodiment is arranged on the waveguide layer 100 and may include a plurality of meta units 200 that modulate incident light of a predetermined wavelength. At least one of the plurality of meta units 200 may include a grating 210 that diffracts incident light, a first electrode 221 arranged under the grating 210, a dielectric layer 230 arranged on the grating 210, and a second electrode 222 arranged on the dielectric layer 230.

The grating 210 may diffract light, and a portion of the diffracted light may resonate in a guided mode along the waveguide layer 100. When light is incident at a predetermined angle, a component that is transmitted from the second surface 120 to the second medium in the light that is not diffracted by the grating 210 and is refracted and incident on the waveguide layer 100 (light of the 0th-order diffraction mode, m=0) and a component that is transmitted from the second surface 120 to the second medium in the light diffracted by the grating 210 and re-diffracted while resonating in the waveguide layer 100 (light in the 1st diffraction mode, m=1) may cause interference. For example, when the two components cause destructive interference, transmission of light from the second surface 120 of the waveguide layer 100 to the second medium may be suppressed. In this case, the reflectance of light on the first surface 110 may be relatively high. Or, for example, when the two components cause constructive interference, transmission of the incident light on the second surface 120 of the waveguide layer 100 may be less suppressed, and accordingly, the reflectance of the incident light on the first surface 110 may be relatively low.

The grating 210 included in each of the plurality of meta units 200 and the first electrode 221 in contact therewith may be spaced apart from each other. The period A of the grating 210 included in each of the plurality of meta units 200 may be referred to as the period of the plurality of meta units 200. The period A of the grating 210 shown in FIG. 1 may be about 300 nm, the height t of the meta unit 200 may be about 30 nm, the width w of the meta unit 200 may be about 83 nm, and the thickness of the waveguide layer 100 may be about 300 nm. The gratings 210 arranged to be spaced apart may be arranged periodically, and the period A of the gratings 210 may be less than the wavelength of the incident light. For example, when the wavelength of the incident light is about 610 nm to about 620 nm in air, the period A of the grating 210 may be less than the wavelength of the incident light in air. For example, the period A of the grating 210 may be about 10 nm to about 600 nm, but is not limited thereto. According to another example embodiment, the period A of the grating 210 may be less than the wavelength of light in the waveguide layer 100.

When the period A of the grating 210 is less than the wavelength of the incident light, high order diffraction may be blocked when the light is incident on the grating 210. The high order diffraction mode may mean an $n^{th}$-order diffraction mode (wherein, n is an integer with an absolute value thereof greater than 1). That is, only $0^{th}$-order mode (m=0) (mode refracted without diffraction), $-1^{st}$ order mode (m=−1) and first order mode (m=1) may occur.

Each of the plurality of meta units 200 is arranged on the waveguide layer 100 and may have a predetermined height t. The predetermined height t of the meta unit 200 may be greater than the height of the grating 210. A portion of the upper surface of the waveguide layer 100, on which the meta unit 200 is arranged, is formed higher than a portion of the upper surface of the waveguide layer 100, on which the meta unit 200 is not arranged, so that a protrusion may be arranged on the upper surface of the waveguide layer 100, and part or all of the protrusion formed of the insulating material included in the waveguide layer 100 may be included in the meta unit 200. For example, the height t of the meta unit 200 may be about 5 nm to about 100 nm, but is not limited thereto.

In addition, the width w of the meta unit 200 may be less than the wavelength of the incident light. For example, the width w of the meta unit 200 may be about 10 nm to about 500 nm, but is not limited thereto.

The grating 210 may include a material of which characteristics of the grating 210 may be changed by an external stimulus. For example, the characteristics of the grating 210 may be at least one of a phase, a dielectric constant, a refractive index, a reflectance, a transmittance, or an absorptivity of the grating 210, and this is merely an example and the characteristics of the grating 210 may be other physical properties, chemical properties, or optical properties. An active element AE may be further included in the meta unit 200 to change the characteristics of the grating 210, and for example, the material included in the grating 210 may be in a state in which excitons absorption may be possible (exciton resonance possible state) or exciton absorption is suppressed (exciton resonance inhibited state) by an external stimulus. In addition, the phase of the material included in the grating 210 may be changed by an external stimulus. The grating 210 may include a material that is reversible to a characteristic change by the active element AE.

The grating 210 may include a two-dimensional material, and for example, may include at least one of graphene, transition metal dichalcogenide (TMDc), or a two-dimensional semiconductor material. For example, the grating 210 may include at least one of molybdenum disulfide ($MoS_2$), molybdenum diselenide ($MoSe_2$), molybdenum ditelluride ($MoTe_2$), tungsten disulfide ($WS_2$), tungsten diselenide ($WSe_2$), or tungsten ditelluride ($WTe_2$), which are transition metal dichalcogenides. Transition metal dichalcogenides may have different optical properties in a state in which exciton absorption is possible (or in a state in which exciton resonance is possible) and in a state in which exciton absorption is suppressed (or in a state in which exciton resonance is suppressed). For example, at least one of dielectric constant, refractive index, transmittance, reflectance, and absorptivity may be different. According to FIG. 2, in the case of $WS_2$, a real part of the permittivity in a state in which exciton absorption is possible and a real part of the permittivity in a state in which exciton absorption is suppressed may be the same at a predetermined wavelength, for example, about 613.7 nm. However, for light with a wavelength less than about 613.7 nm, the real part of the permittivity of $WS_2$ may be less in the state in which exciton absorption is possible than in the state in which exciton absorption is suppressed, and for light with a wavelength greater than about 613.7 nm, the real part of the permittivity of $WS_2$ may be greater in a state in which exciton absorption is possible than in a state in which exciton absorption is suppressed. At this time, when the real part of the permittivity of the material is greater in the first state than in the second state, the refractive index in the first state may be greater than the refractive index in the second state. Also, the imaginary part of the permittivity of $WS_2$ when exciton absorption is possible may be greater than the imaginary part of the permittivity of $WS_2$ when exciton absorption is suppressed. At this time, when the imaginary part of the permittivity of the material is greater in the first state than in the second state, the light absorbance in the first state may be greater than the light absorbance in the second state.

The grating 210 included in each of the plurality of meta units 200 may be arranged spaced apart in the first direction, and each spaced apart grating 210 may form a grating structure. Here, the first direction may be a direction substantially perpendicular to the thickness direction of the waveguide layer 100. However, the first direction is not limited to the above example and may be different depending on the shape of the waveguide layer 100. Light diffracted from the first surface 110 of the waveguide layer 100 and incident is reflected by the first surface 110 and the second surface 120 to be guided in the first direction. When the gratings 210 included in each of the plurality of meta units 200 are spaced apart from each other in the first direction, this may be that the plurality of meta units 200 are one-dimensionally arranged. The meta-optics 10 including a plurality of meta units 200 arranged one-dimensionally may steer the beam in a first direction in which the gratings 210 are spaced apart. As in the above example, the plurality of meta units 200 may be arranged one-dimensionally, but embodiments are not limited thereto, and a plurality of meta units 200 may be arranged two-dimensionally. In this case, the plurality of meta units 200 may be arranged in a first direction and a second direction perpendicular to the first direction. That is, the gratings 210 included in each of the plurality of meta units 200 may be arranged to be spaced apart from each other in the first direction and the second direction. In this case, the meta-optics 10 including a plurality of two-dimensional meta units 200 may steer the beam in the first direction and the second direction in which the gratings 210 are spaced apart. Here, the first direction may be a direction perpendicular to the second direction.

At least one of the plurality of meta units 200 according to an example embodiment may include an active element AE for applying a stimulus to the grating 210. When the grating 210 is stimulated by the active element AE, the dielectric constant, refractive index, and absorption coefficient of the grating 210 may change, and accordingly, the reflectance and transmittance of the meta-optics 10 with respect to light may be changed. Stimulus applied by the active element AE may be, for example, electric field application, magnetic field application, voltage application, optical pumping, chemical reaction, temperature change (heating), mechanical deformation, or the like. The active element AE may be, for example, an electrical gating structure, an optical stimulation structure, a chemical reaction structure, a magnetic field application structure, a heating structure, or a mechanical deformation structure.

The active element AE may change the characteristics of the grating 210 through voltage application, light application, chemical reaction induction, magnetic field application, heating or cooling, mechanical force application, and the like to the grating 210. For example, by changing the properties (e.g., dielectric constant, refractive index, absorptivity, and exciton density) of the two-dimensional material included in the grating 210, the reflectance, transmittance, and/or absorption of the meta-optics 10 for a predetermined wavelength of light may be changed. However, the changing properties of the two-dimensional material are not limited to the exemplary properties listed above, and other physical or chemical properties of the material may be changed. For example, electrical properties, optical properties, magnetic properties, thermal properties, crystal structural properties, and the like may be changed. The properties may include thermal conductivity, electrical conductivity, grating constant, magnetoresistance, and the like. Characteristic change of the grating 210 through the active element AE may be reversible, but is not limited thereto.

Whether resonance of excitons included in the grating 210 is possible may be determined according to stimulation through the active element AE of the plurality of meta units 200. When the active element AE is switched on, in the grating 210, exciton absorption may be suppressed (exciton resonance is suppressed), and when the active element AE is switched off, in the grating 210, exciton absorption may be possible (exciton resonance is possible). When the size of the stimulus is appropriately adjusted through the active element AE, the exciton density may be adjusted. Accordingly, an intermediate state characteristic between the grating 210 characteristic state at certain thresholds (e.g., when exciton density is at its maximum) during the switching on state, and the grating 210 characteristic state of the switched off state may be obtained, and these features may be applied to the meta-optics 10 and an electronic device including the same according to an example embodiment.

The active element AE may include, for example, a first electrode 221, a second electrode 222, and a dielectric layer 230 electrically insulating the first electrode 221 and the second electrode 222. Here, the active element AE is an electrical gating structure, and may have a structure for applying a voltage to both ends of the grating 210.

When the active element AE is included in the meta-optics 10 according to the example embodiment, the guided mode resonance wavelength of light in the waveguide layer 100 of the meta-optics 10 may be changed. Therefore, it may be difficult to directly apply the optical properties seen by the meta-optics of passive device that do not include active elements AE to the meta-optics 10 of the active device including the active element AE.

According to the example embodiment of FIG. 3A, the period A of the grating 210 of the meta-optics 10 is about 300 nm, the height t of the meta unit 200 is about 30 nm, the width w of the meta unit 200 is about 83 nm, the thickness of the waveguide layer 100 is about 300 nm, the thickness of the first electrode 221 and the second electrode 222 is about 10 nm, and the thickness of the dielectric layer 230 is about 15 nm. The grating 210 includes tungsten disulfide ($WS_2$), the waveguide layer 100 includes silicon nitride ($Si_3N_4$), the substrate 50 includes silicon dioxide ($SiO_2$), the first electrode 221 and the second electrode 222 include aluminum zinc oxide (AZO), and the dielectric layer 230 includes aluminum oxide ($Al_2O_3$). In this case, the guided mode resonance wavelength is about 615.8 nm. However, the guided mode resonance wavelength may be changed by various factors, such as the height t of the meta unit 200, the period A of the grating 210, and the thickness of the waveguide layer 100. In the above example, the guided mode resonance wavelength of the meta-optics of the passive device without the first electrode 221, the second electrode 222, and the dielectric layer 230 may be about 613.7 nm, and this difference may be due to a difference in the presence or absence of an active element. In other words, this change may be because the conditions of guided mode resonance (GMR) are changed by the added electrode layer and dielectric layer 230 in the above example due to the addition of the active element AE. This change in GMR wavelength is exemplary, and in addition, various characteristics such as dielectric constant, refractive index, reflectance, and transmittance of the meta-optics 10 may be changed during exciton absorption or exciton absorption suppression.

Referring to FIGS. 3A and 3B, a plurality of meta units 200 of the meta-optics 10 according to an example embodiment may include a first electrode 221 arranged under the grating 210 and a second electrode 222 arranged above the grating 210, as an active element AE. The first electrode 221, the second electrode 222, and the dielectric layer 230 may form the active element AE configured to apply a voltage to the grating 210. The gratings 210 included in each of the plurality of meta units 200 may be arranged to be spaced apart from each other, and the first electrodes 221 included in each of the plurality of meta units 200 may also be arranged to be spaced apart from each other. The grating 210 and the first electrode 221 included in one of the plurality of meta units 200 may contact each other. The grating 210 and the first electrode 221 included in one of the plurality of meta units 200 may correspond to each other one-to-one, and accordingly, a voltage may be independently applied to each of the plurality of meta units 200. That is, since the voltage may be adjusted for each of the plurality of meta units 200, the meta-optics 10 according to an example embodiment may be an active device configured to selectively apply a voltage to each meta unit 200.

The first electrodes 221 included in each of the plurality of meta units 200 may not be electrically connected to each other. The second electrode 222 may be arranged on the grating 210, and the second electrode 222 included in each of the plurality of meta units 200 may be arranged to be spaced apart from each other. According to another example embodiment, the second electrode 222 included in each of the plurality of meta units 200 may wrap the upper surface of the grating 210 and the side surface of the grating 210, and may extend on the upper surface of the waveguide layer 100 in the first direction, and may be connected to each other. By the second electrode 222 provided adjacent to and surrounding the upper surface of the grating 210 and the side surface of the grating 210, absorption or scattering of light disturbing GMR may be reduced, and accordingly, GMR may occur relatively well.

The first electrode 221 and the second electrode 222 may be spaced apart from each other and may be electrically insulated from each other. A dielectric layer 230 for electrical insulation between the two layers may be arranged between the first electrode 221 and the second electrode 222. A voltage may be applied to each of the first electrode 221 and the second electrode 222, and a potential difference between the two electrode layers may be applied to the grating 210. Due to the potential difference between the first electrode 221 and the second electrode 222, a state of the material included in the grating 210 may be changed from a state in which exciton absorption is possible (or in a state in which exciton resonance is possible) to a state in which exciton absorption is suppressed (or in a state in which exciton resonance is suppressed). A potential difference applied to each of the plurality of meta units 200 may be independent of each other.

The first electrode 221 and the second electrode 222 may be a transparent conducting film (TCO) which is optically transmissive and has a relatively low electrical resistance. For example, the first electrode 221 and the second electrode 222 may include indium tin oxide (ITO), indium zinc oxide (IZO), aluminum zinc oxide (AZO), indium gallium zinc oxide (IGZO), and the like. In the example of FIGS. 3A and 3B, the material included in the first electrode 221 and the second electrode 222 is AZO. The thickness of the first electrode 221 and the second electrode 222 arranged in FIGS. 3A and 3B may be about 10 nm. However, embodiments are not limited thereto and the first electrode 221 and the second electrode 222 may have a thickness of several nanometers to several tens of nanometers.

Referring to FIGS. 3A and 3B, the plurality of meta units 200 may include a dielectric layer 230. The dielectric layer 230 may electrically insulate the first electrode 221 and the second electrode 222. The dielectric layer 230 may be arranged between the first electrode 221 and the second electrode 222. The dielectric layers 230 included in each of the plurality of meta units 200 may be arranged to be spaced apart from each other. According to another example embodiment, the dielectric layer 230 included in each of the plurality of meta units 200 may cover the upper surface and the side surface of the grating 210, and may extend to the upper surface of the waveguide layer 100 and may be connected to each other. The second electrode 222 may also cover the side surface of the grating 210, and may extend on the upper surface of the waveguide layer 100 in the first direction to be connected to each other. When extending to the upper surface of the waveguide layer 100, the dielectric layer 230 may extend along the lower portion of the extending second electrode 222.

The dielectric layer 230 includes a dielectric material, and may include, for example, silicon oxide ($SiO_2$), hafnium oxide ($HfO_2$), titanium oxide ($TiO_2$), aluminum oxide ($Al_2O_3$), or the like. In the example of FIGS. 3A and 3B, the material included in the dielectric layer 230 is $Al_2O_3$, and $Al_2O_3$ has a relatively high level of maximum applicable voltage (breakdown field) of 7 MV/cm, and has relatively high dielectric strength, so that $Al_2O_3$ may be suitable for the dielectric layer 230. The thickness of the dielectric layer 230 of FIGS. 3A and 3B may be about 15 nm. However, embodiments are not limited thereto and the dielectric layer 230 may have a thickness of several nanometers to several tens of nanometers.

The meta-optics 10 according to an example embodiment may be an active device including a grating 210 layer and an active element AE. As described above, since the active device includes the active element AE, even when the active element AE has the same grating 210 as the passive element, its physical properties, for example, optical properties, may be different from those of the passive device. In addition, by being able to transform the characteristics of the grating 210 by the active element AE, some of the plurality of meta units 200, or each of the plurality of meta units 200 may be tuned. As shown in FIGS. 3A and 3B, when including a voltage application structure including the first electrode 221 and the second electrode 222 as the active element AE, each of the gratings 210 of the plurality of meta units 200 may be independently electrically tuned.

Next, an optical path according to GMR will be described.

Figure 4:
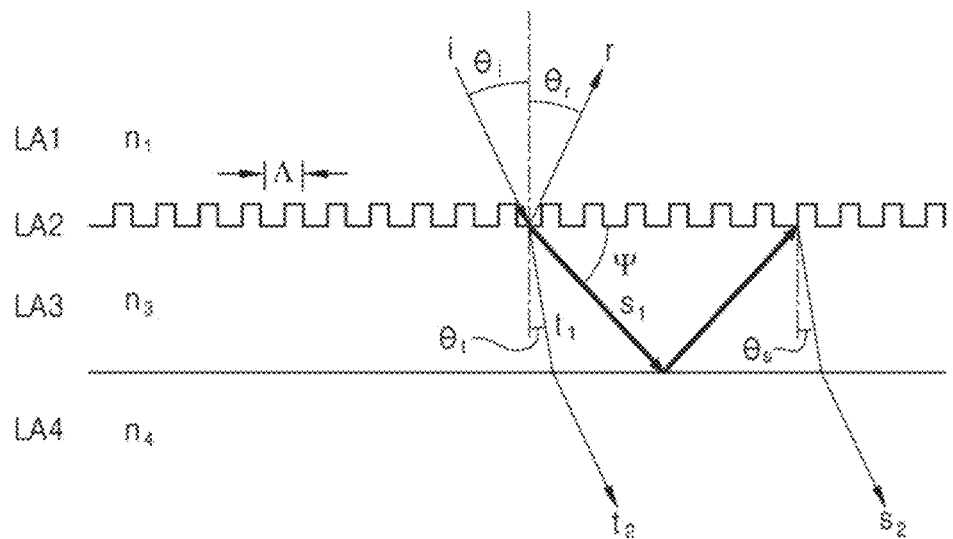
FIG. 4 is a conceptual diagram illustrating an optical path of light incident on a meta-optics.
Figure 5:
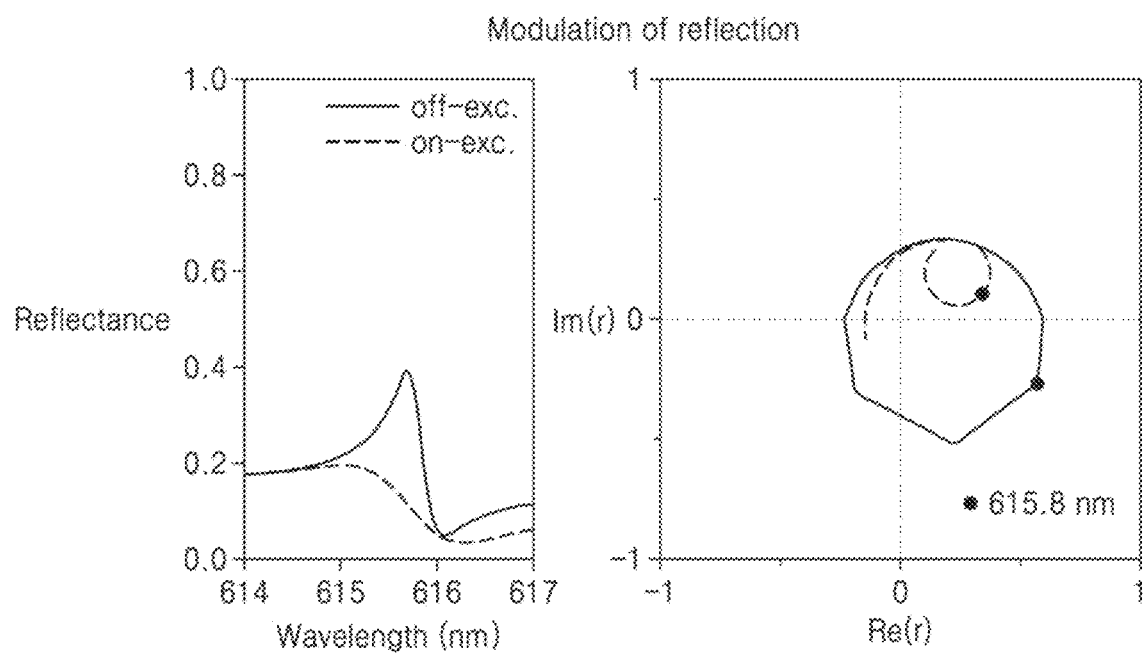
FIG. 5 is a graph of reflectance and a phasor according to an exciton resonance state of $WS_2$ that changes with the wavelength of incident light of the meta-optics of FIG. 3A.

FIG. 4 is a conceptual diagram illustrating an optical path of light incident on a meta-optics. FIG. 5 is a graph of reflectance and a phasor according to the exciton resonance state of $WS_2$ that changes according to the wavelength of the incident light of the meta-optics of FIG. 3A, and FIG. 6 is a graph of transmittance and a phasor according to an exciton resonance state of $WS_2$ that changes according to the wavelength of incident light of the meta-optics of FIG. 3A.

Referring to FIG. 4, the waveguide layer LA3 may include a first surface on which a grating structure LA2 is, and a second surface in contact with a second medium LA4. A portion of the light i incident on the grating structure LA2 at an incident angle $\theta_i$ may be transmitted without diffraction ($0^{th}$-order diffraction mode, m=0) on the first surface of the waveguide layer LA3. Since the refractive index n3 of the waveguide layer LA3 is greater than the refractive index n1 of the first medium LA1 on the grating structure LA2, the refraction angle $\theta_r$ may be less than the incident angle $\theta_i$. The light $t_1$ transmitted without diffraction may cross the waveguide layer LA3 and be refracted at the second surface to exit the waveguide layer LA3, and the exited light t2 may be incident on the second medium LA4 under the waveguide layer LA3. In addition, a portion $s_1$ of light incident on the grating structure LA2 may be diffracted by the grating structure LA2 on the first surface of the waveguide layer LA3. The diffraction angle ψ may be different from the refraction angle $\theta_r$. The diffracted light $s_1$ may be coupled in a guided mode and guided in the lateral direction of the waveguide layer LA3, and this may be GMR. Light traveling in the lateral direction in the guided mode may be slightly leaked out from the first surface or the second surface. Light $s_2$ emitted from the second surface among the light $s_1$ performing GMR may be incident on the second medium LA4 under the waveguide layer LA3, and may interfere with the light $t_2$ that is refracted at the second surface among the light $t_1$ incident on the waveguide layer LA3 and exits the medium LA4 without diffraction. In this case, the diffraction angle $\theta_s$ with respect to the normal of the light $s_2$ diffracted from the first surface during GMR at a particular angle or a particular angle range may be substantially equal to the refraction angle $\theta_r$. A portion of the light i incident on the grating structure LA2 at an incident angle $\theta_i$ may be reflected from the first surface. The reflection angle $\theta_r$ of the light r reflected from the first surface may be equal to the incident angle $\theta_i$, and the light may be modulated upon reflection.

In the example embodiment according to FIGS. 3A, 3B, 5 and 6, the meta-optics 10 may include the first electrode 221 and the second electrode 222, which apply a voltage to the grating 210, as the active element AE. When the active element AE is included in the meta-optics 10 according to the example embodiment, the GMR wavelength of light in the waveguide layer 100 of the meta-optics 210 may be changed. Therefore, it may be difficult to directly apply the optical properties seen by the meta-optics of passive devices that do not include active elements AE to the meta-optics 10 of the active device including the active element AE. For example, when the active element AE includes the first electrode 221, the second electrode 222, and the dielectric layer 230, this may be because the GMR condition is changed by the first electrode 221, the second electrode 222, and the dielectric layer 230.

Figure 6:
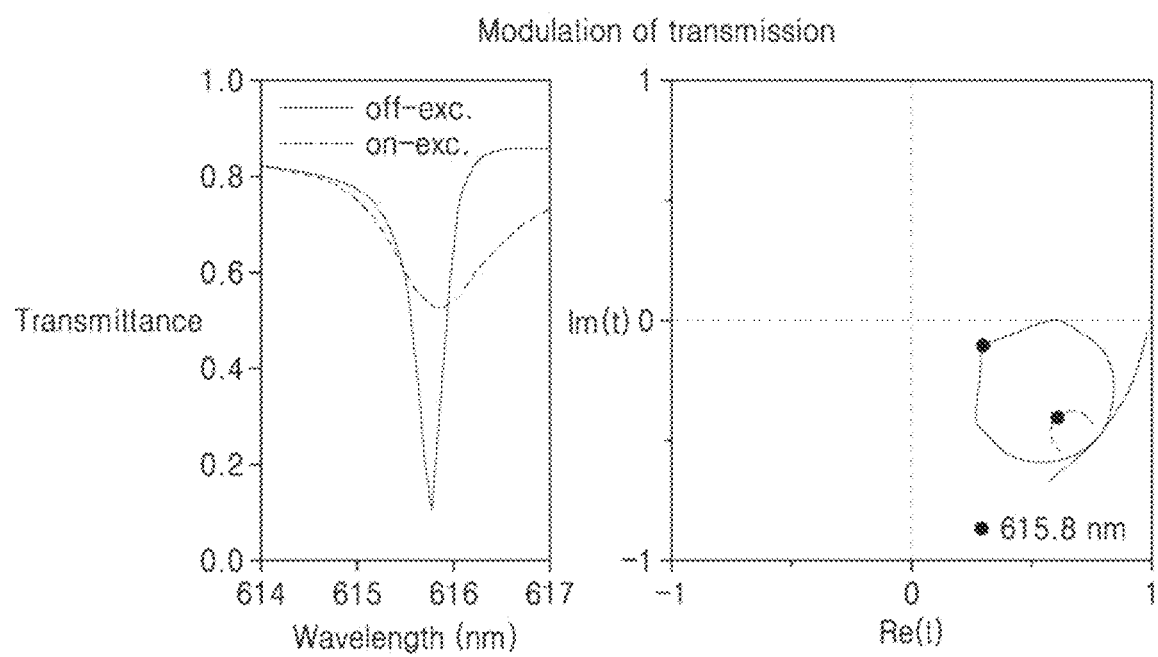
FIG. 6 is a graph of transmittance and a phasor according to the exciton resonance state of $WS_2$ that changes with the wavelength of incident light of the meta-optics of FIG. 3A.

For example, when the meta-optics 10 includes the waveguide layer 100 including $WS_2$ and the grating 210, and does not include the active element AE, the resonance wavelength of $WS_2$ may be about 613.7 nm, and when the meta-optics 10 includes the waveguide layer 100 comprising $WS_2$, the grating 210, and the electrode layer and the dielectric layer 230 configured to provide a potential difference to the grating 210, as shown in FIGS. 5 and 6, the resonance wavelength of $WS_2$ may be changed to about 615.8 nm. This change of the resonance wavelength is only an example, and in addition, various characteristics such as dielectric constant, refractive index, reflectance, and transmittance may be changed during exciton absorption or exciton absorption suppression.

According to FIGS. 2 to 3B, 5, and 6, when an external stimulus is applied to the grating 210 so that exciton absorption of $WS_2$ is suppressed, the imaginary part of the dielectric constant of $WS_2$ may have a relative value of about 5 or less in a range including a predetermined wavelength. In this case, $WS_2$ has relatively low light absorption at a predetermined wavelength, so that GMR of light in the waveguide layer 100 may not be disturbed. When light has GMR, the phase difference between the light emitted from the second surface 120 and the light refracted by the second surface 120 may be $(2n+1)*\pi(rad)$ (where n is an integer greater than or equal to 1), and in this case, the two lights may cause destructive interference, so that transmission may be suppressed on the second surface 120. FIG. 5 shows that the solid reflectance graph has an upward peak at a predetermined wavelength according to the result of suppression of transmission, and FIG. 6 shows that the solid line transmittance graph has a downward dip in a range near a predetermined wavelength.

When an external stimulus is not applied to the grating 210 so that exciton absorption of the material (e.g., $WS_2$) included in the grating 210 is possible, according to FIG. 2, the imaginary part of the dielectric constant of $WS_2$ may have a relatively large value exceeding about 20 at a predetermined wavelength. In this case, $WS_2$ may absorb light of a preset wavelength, and GMR may be disturbed by light absorption, so that resonance may be weakened or may not occur. Due to this, destructive interference between the light due to GMR and the light directly passing through the meta-optics 10 may not occur, and the above-described transmission inhibition may not occur. In addition, resonance does not occur, so that reflectance may be lowered due to relatively high light absorption. FIG. 5, shows that the dotted line reflectance graph has a dip down at a predetermined wavelength as the light is absorbed, and FIG. 6 shows that the dashed line transmittance graph has a dip down near a predetermined wavelength, but the light absorption increases, so that the depth of the dip is less than the solid line transmittance graph and the profile of the dip is broadened.

In addition, according to the reflectance phasor of FIG. 5, the phasor (solid line) when exciton absorption is suppressed and the phasor (dashed line) when exciton absorption is possible may be identified. When exciton absorption is suppressed at a wavelength of about 615.8 nm, one point of the phasor may be located farthest from the origin, which may mean a reflectance peak. When exciton absorption is possible at a wavelength of about 615.8 nm, one point of the phasor may be located relatively close to the origin.

In addition, according to the transmittance phasor of FIG. 6, the phasor (solid line) when exciton absorption is suppressed and the phasor (dashed line) when exciton absorption is possible may be identified. When exciton absorption is suppressed at a wavelength of about 615.8 nm, a point of the phasor may be located closest to the origin, which may mean a reflectance dip. When exciton absorption is possible at a wavelength of about 615.8 nm and a wavelength with a minute difference of about 0.5 nm or less, one point of the phasor may be located closest to the origin, which may mean a reflectance dip.

According to whether the active element AE included in the meta-optics 10 according to an example embodiment is stimulated, at least one of reflectance or transmittance of the grating 210 corresponding to each active element AE for a predetermined wavelength may have a difference greater than or equal to about 20%.

Referring to FIGS. 5 and 6, the reflectance with respect to the incident light of the meta-optics 10 including the first electrode 221, the second electrode 222, and the dielectric layer 230 according to the example embodiment may have a difference greater than or equal to about 20% when a predetermined voltage is applied and when no voltage is applied, or the transmittance of the meta-optics 10 with respect to the incident light may have a difference greater than or equal to about 20% when a predetermined voltage is applied and when no voltage is applied. Referring to FIGS. 5 and 6, at a wavelength of about 615.8 nm, when suppressing exciton absorption of $WS_2$, the reflectance is about 40%, and when exciton absorption of $WS_2$ is possible, the reflectance is about 10%, so that the difference may be as high as about 30%. In addition, at a wavelength of about 615.8 nm, when the exciton absorption of $WS_2$ is suppressed, the transmittance is about 10%, and when the exciton absorption of $WS_2$ is possible, the transmittance is about 55%, so that the difference may be as high as about 20%. When the difference between the reflectance or transmittance before and after the change in the characteristics of the grating 210 is sufficiently large, the meta-optics 10 may act as a good light modulator providing a large modulation phase difference at the resonance wavelength. A value between the minimum reflectance and the maximum reflectance of the meta-optics 10 according to the change in the permittivity of the grating 210 may be implemented by the above-described intermediate state, and likewise, a value between the minimum transmittance and the maximum transmittance of the meta-optics 10 may be implemented by the above-described intermediate state.

The Q-factor of reflectance and transmittance may be calculated through Equation (1) as follows.

$$Q = \frac{\lambda_r}{\Delta\lambda} \qquad \text{Equation (1)}$$

In Equation (1), $\lambda_r$ is the resonance wavelength, and $\Delta\lambda$ is the full width at half maximum (FWHM). When the exciton absorption suppression of the material included in the grating 210, light absorption for the material is reduced, and GMR may occur, and also, since destructive interference may occur, the Q factor may be increased. The meta-optics 10 with a relatively high Q factor provide a large modulation phase difference at the resonance wavelength and may serve as a good light modulator with relatively low optical loss.

The meta-optics 10 according to the example embodiments of FIGS. 3A, 3B, 5 and 6 may have a Q factor of several hundred to several thousand. For example, the Q factor of the meta-optics 10 according to an example embodiment may be greater than or equal to about 100. The Q factor for transmittance of FIG. 6 has a very high value of about 1000, and the Q factor for reflectance may be relatively high in the same manner as the Q factor for transmittance. For example, the Q factor for reflectivity may have a value from about 300 to about 1500. However, embodiments are not limited thereto, and the Q factor of reflectance or Q factor of transmittance may have a relatively high value of greater than or equal to about 1000.

As such, the meta-optics 10 according to an example embodiment may provide the meta-optics 10 configured to modulate the amplitude and/or phase of reflected light and/or transmitted light by applying or not applying a stimulus to the grating 210 by an active element AE. In addition, the meta-optics 10 according to the example embodiment may provide a light modulator having a wide modulation range of light, relatively high-speed operation, and a relatively high Q factor.

Figure 7:
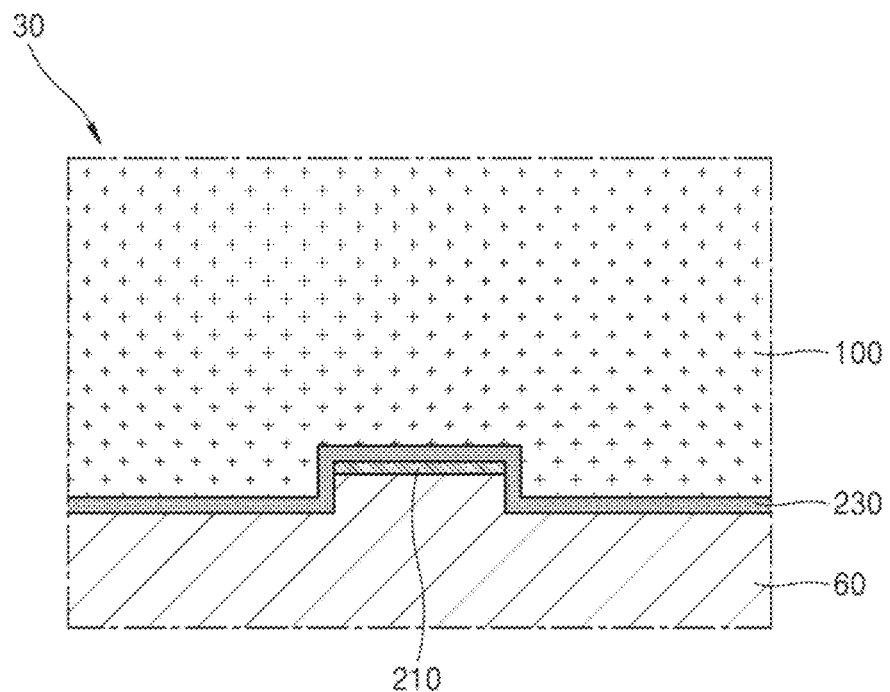
FIG. 7 is a cross-sectional view of meta-optics for optical pumping according to an example embodiment.
Figure 8:
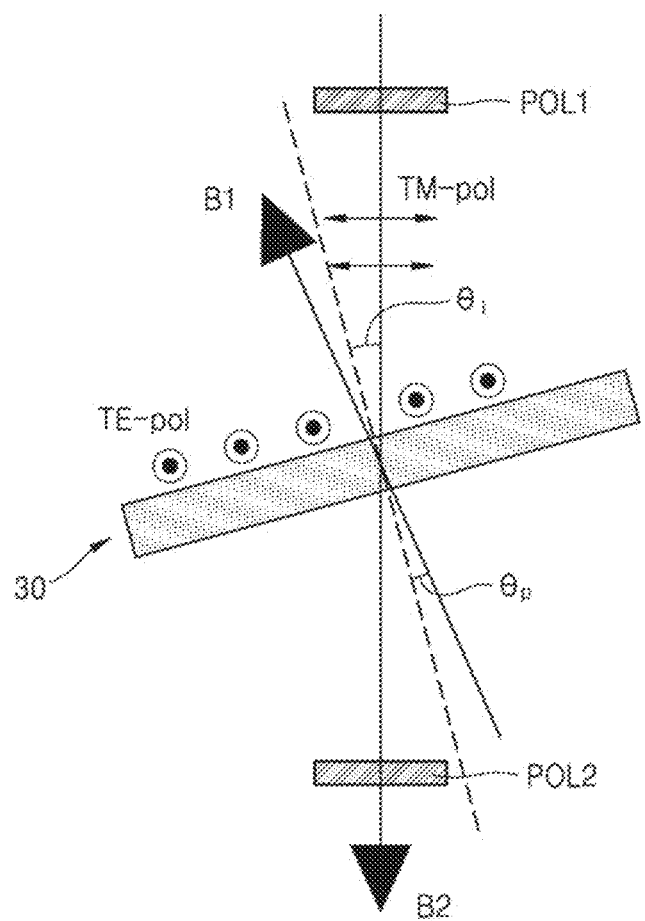
FIG. 8 is a conceptual diagram of a light pumping measurement set-up of meta-optics according to an example embodiment.

FIG. 7 is a cross-sectional view of a meta-optics according to an example embodiment for optical pumping, and FIG. 8 is a conceptual diagram of a light pumping measurement set-up of the meta-optics according to an example embodiment.

The characteristics of the grating 210 included in the meta-optics 30 according to an example embodiment may be changed through stimulation such as optical pumping. FIG. 7 may be a structure of the meta-optics 30 according to an example embodiment for light pumping, and the waveguide layer 100 may include silicon nitride ($Si_3N_4$), and the grating 210 may include tungsten disulfide ($WS_2$), and the dielectric layer 230 may include aluminum oxide ($Al_2O_3$). In addition, the substrate 60 may be arranged under the waveguide layer 100 and the dielectric layer 230. The substrate 60 may include a light-transmitting material. For example, the substrate 60 may be a quartz substrate including silicon dioxide ($SiO_2$). In this case, each of the plurality of meta units 200 may include a protrusion of the substrate 60, and the grating 210 may be arranged in contact with the protrusion of the substrate 60. In addition, the grating 210 and the waveguide layer 100 may be spaced apart by the dielectric layer 230. In the above example, light may be incident into the waveguide layer 100 through the substrate 60.

Since light pumping is used, the active element AE may include a light source instead of an electrode layer. The waveguide layer 100 may have a thickness that allows incident light to be well condensed, and this thickness may be appropriately selected. When the light resonates in the guided mode, light may be emitted after staying as much as $Q/2\pi$ in the waveguide layer 100, and the interaction between light and grating 210 may be as much as $(\lambda Q)/(2\pi ng)$. Here, $\lambda$ is the wavelength of the light, and $n_g$ is the group index of the guided mode light. When the grating 210 having a group refractive index has a nanometer-scale thin structure, a relatively high Q value may be obtained, and the interaction between light and the grating 210 may be increased by this amount. In the meta-optics 30 of FIG. 7, by setting the protrusion thickness of the waveguide layer 100 on which the meta unit 200 is arranged to about 50 nm, the radiation Q factor and the absorption Q factor may be adjusted to almost the same value. Under such conditions, when light resonates, the reflectance or transmittance may be almost zero or a very small value, and accordingly, the scattering characteristics of the exciton absorption enabled state and the exciton absorption inhibited state may be efficiently modulated. The thickness of the protrusion is exemplary, and the thickness of the protrusion may be appropriately selected according to various conditions.

Optical properties of the meta-optics 30 according to the example embodiment may be measured using pump/probe spectroscopy. In the experimental examples of FIGS. 7 and 8, the grating 210 of the meta-optics 30 may include $WS_2$, the waveguide layer 100 may include silicon nitride ($Si_3N_4$), the thickness of the waveguide layer 100 may be about 300 nm, the dielectric layer 230 may include aluminum oxide ($Al_2O_3$), and the thickness of the dielectric layer 230 may be about 5 nm. In the experimental examples of FIGS. 7 and 8, a pump beam B1 may be radiated with an incident angle $\theta_p$ inclined by about 5.3 degrees to the vertical direction of the meta-optics 30, and the pump beam B1 may have a wavelength of about 532 nm, and the intensity of the pump beam B1 may be about 300 mW/mm$^2$. The GMR wavelength of the meta-optics 30 of FIGS. 7 and 8 may be about 615 nm. However, embodiments are not limited thereto, and the wavelength intensity, the intensity of the pump beam B1, or the GMR wavelength of the pump beam B1 may vary according to the configuration of the meta-optics 30.

The pump beam B1 may serve to excite the sample (e.g., the meta-optics 30) to which the pump beam B1 is radiated, and for example, may suppress exciton absorption of a material included in the grating 210 of the meta-optics 30. Conversely, when the pump beam B1 is not radiated, exciton absorption may be possible. The light source irradiating the pump beam B1 is one of the active elements AE, and may correspond to the first electrode 221 and the second electrode 222 described above, and light pumping through the pump beam B1 may correspond to applying a potential difference using an electrode layer. The probe beam B2 may be used to monitor changes in optical properties (e.g., reflectance or transmittance, etc.) of the sample induced by the pump beam B1. The probe beam B2 may be incident on the meta-optics 30 at an incident angle $\theta_i$. The probe beam B2 is emitted from a super continuum light source, and thus may include light of several wavelengths. The probe beam B2 may pass through the first polarizer POL1 having a direction of about −45 degrees to the thickness direction of the meta-optics 30 before being incident on the meta-optics 30. The probe beam B2 passing through the first polarizer POL1 may include both a transverse electric (TE)-pol mode and a transverse magnetic (TM)-pol mode. After interacting with the meta-optics 30, the emitted light may pass through the second polarizer POL2 having a direction of about 45 degrees to the thickness direction of the meta unit 200. Since the directions of the first polarizer POL1 and the second polarizer POL2 differ by 90 degrees, components (0th-order diffraction mode, m=0) that pass directly through the light without interacting with the meta-optics 30 may be removed from the light detection. Accordingly, scattering intensity according to the wavelength and the incident angle of the probe beam B2 may be measured.

Figure 9A:
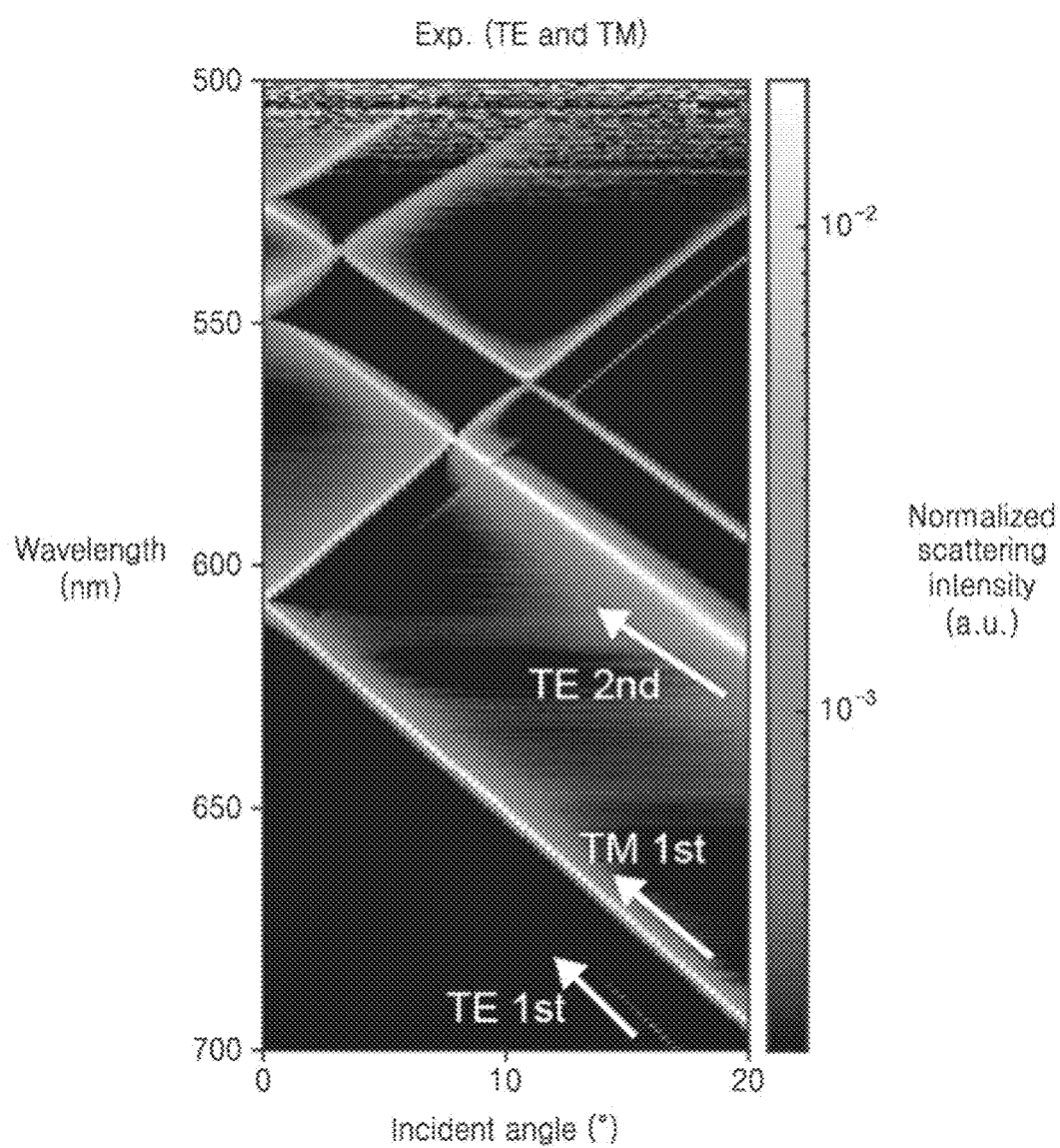
FIG. 9A is a graph showing experimental results showing scattering intensity according to an incident angle and a light wavelength when the pump beam is not radiated in FIG. 8.
Figure 9B:
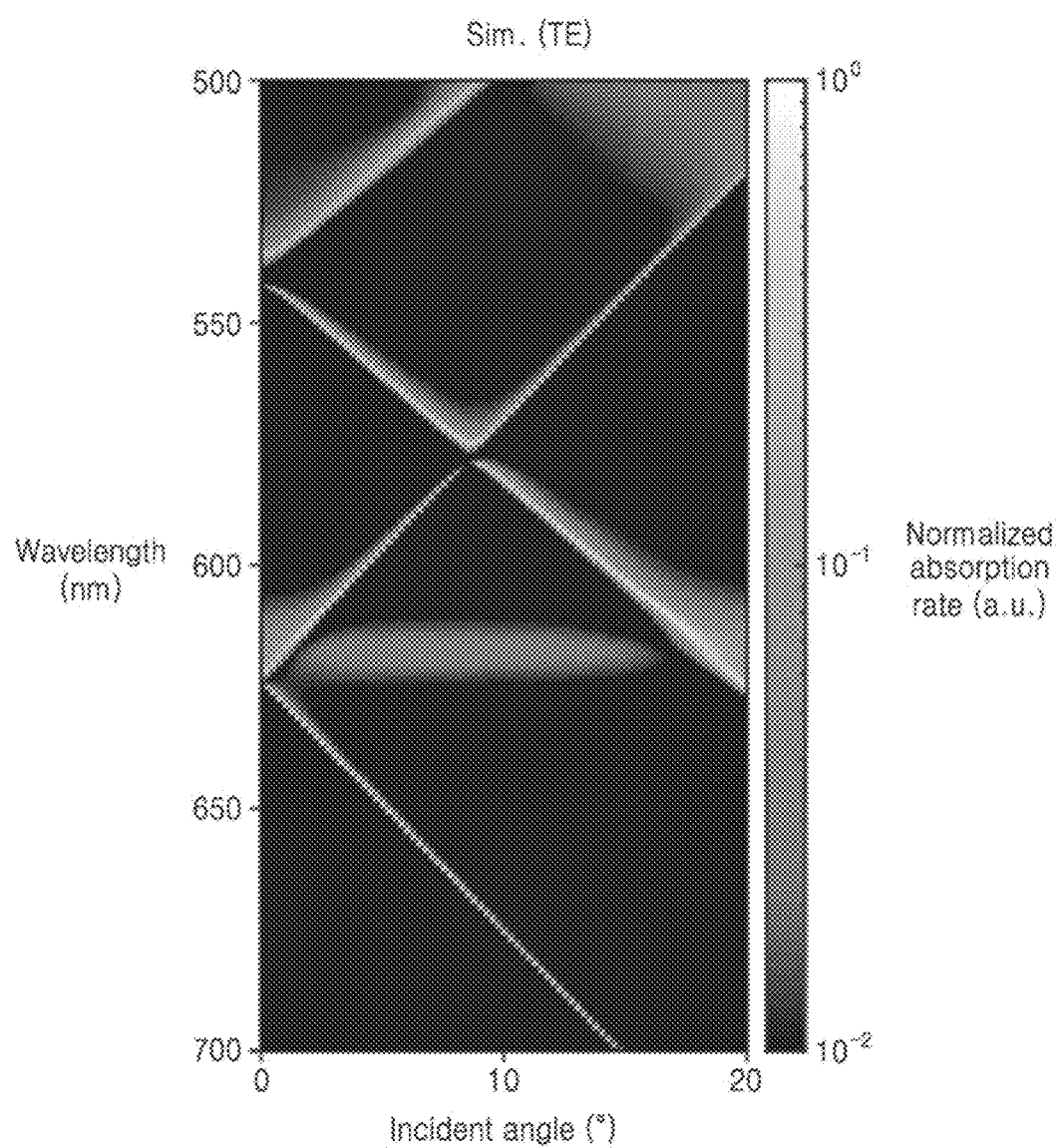
FIG. 9B is a simulation result graph showing light absorption according to an incident angle and a light wavelength when the pump beam is not radiated in the TE mode.
Figure 9C:
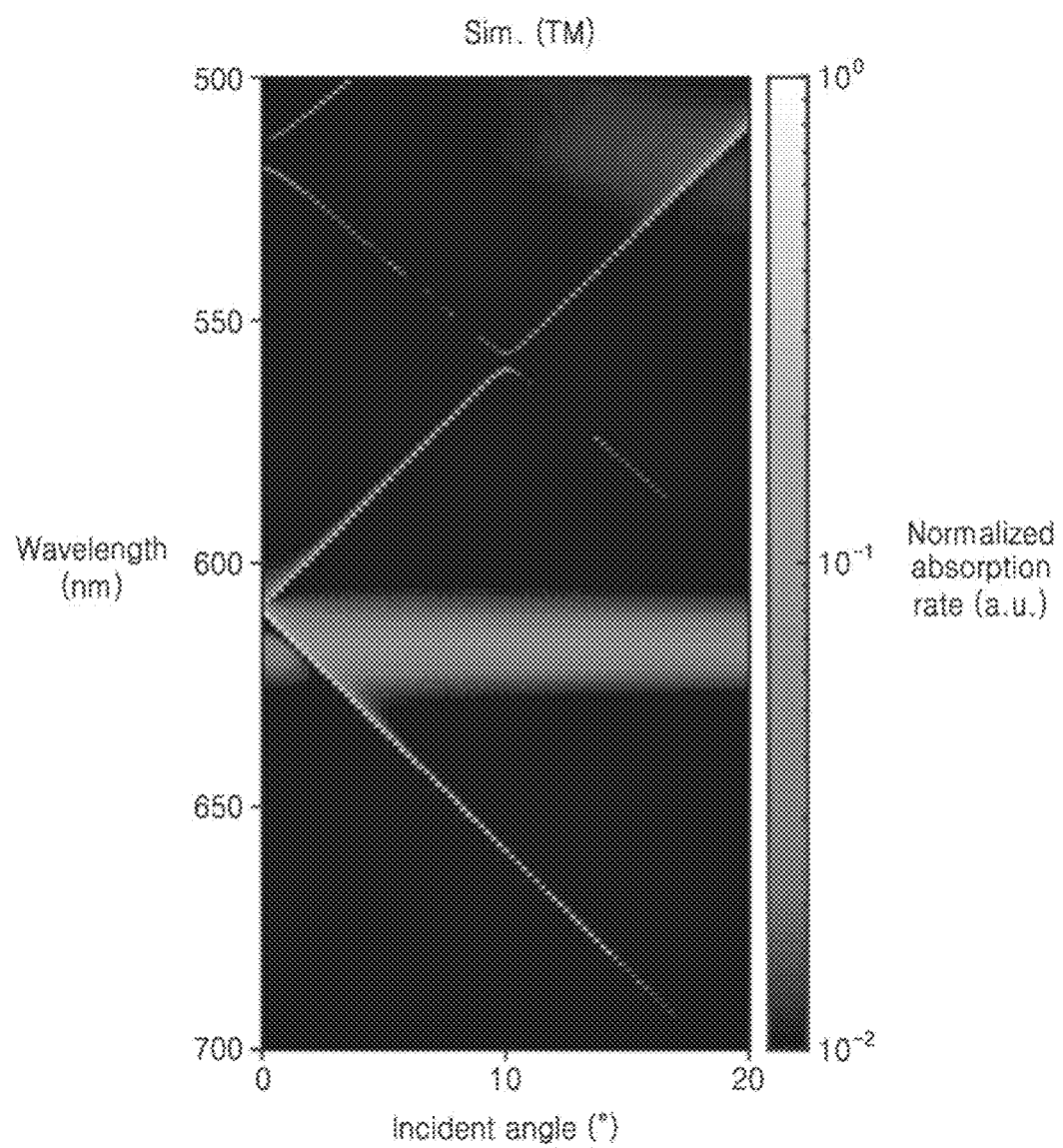
FIG. 9C is a simulation result graph showing the incident angle $\theta_i$, the light wavelength, and the light absorption when the pump beam is not radiated in the TM mode.

FIG. 9A is a graph of experimental results showing scattering intensity according to incident angle and light wavelength when the pump beam is not radiated in FIG. 8, FIG. 9B is a simulation result graph showing light absorption according to incident angle and light wavelength when the pump beam is not radiated in the TE mode, and FIG. 9C is a simulation result graph showing incident angle $\theta_i$, light wavelength, and light absorption when the pump beam is not radiated in the TM mode.

Referring to FIG. 9A, several branches showing strong scattering intensity may be identified, and each branch may represent an $n^{th}$-order TE mode (n is an integer greater than or equal to 1), or an $m^{th}$-order TM mode (m is an integer greater than or equal to 1). FIG. 9A shows a primary TE mode branch, a secondary TE mode branch, and a primary TM mode branch. Through the branches, it is possible to check the scattering peak for each wavelength according to different angles of incidence, and a larger scattering size may mean that a larger amount of light is scattered by GMR.

In relation to the secondary TE mode branch, for light incident with an incident angle of 17 degrees in a wavelength band near about 615 nm to which the exciton of $WS_2$ corresponds, exciton absorption is possible, and in this case, the linewidth of the scattering peak may increase near the GMR wavelength. In FIG. 9B, the branch showing the absorption of the TE mode may be confirmed, and in FIG. 9C, the branch showing the absorption of the TM mode may be confirmed. Here, also in the secondary TE mode branch, light absorption may occur well in the wavelength band of about 615 nm which corresponds to the exciton absorption wavelength of $WS_2$. As light absorption increases, resonance may not occur well. FIGS. 9B and 9C show that light absorption is relatively high at a wavelength of about 615 nm regardless of the incident angle. This may be because the exciton resonance wavelength of the material included in the grating 210 of the meta-optics 30 is about 615 nm. The secondary TE mode branch overlaps with exciton absorption (exciton resonance) in the wavelength band of about 615 nm, so that the linewidth is increased at an incident angle of about 17 degrees.

Figure 10:
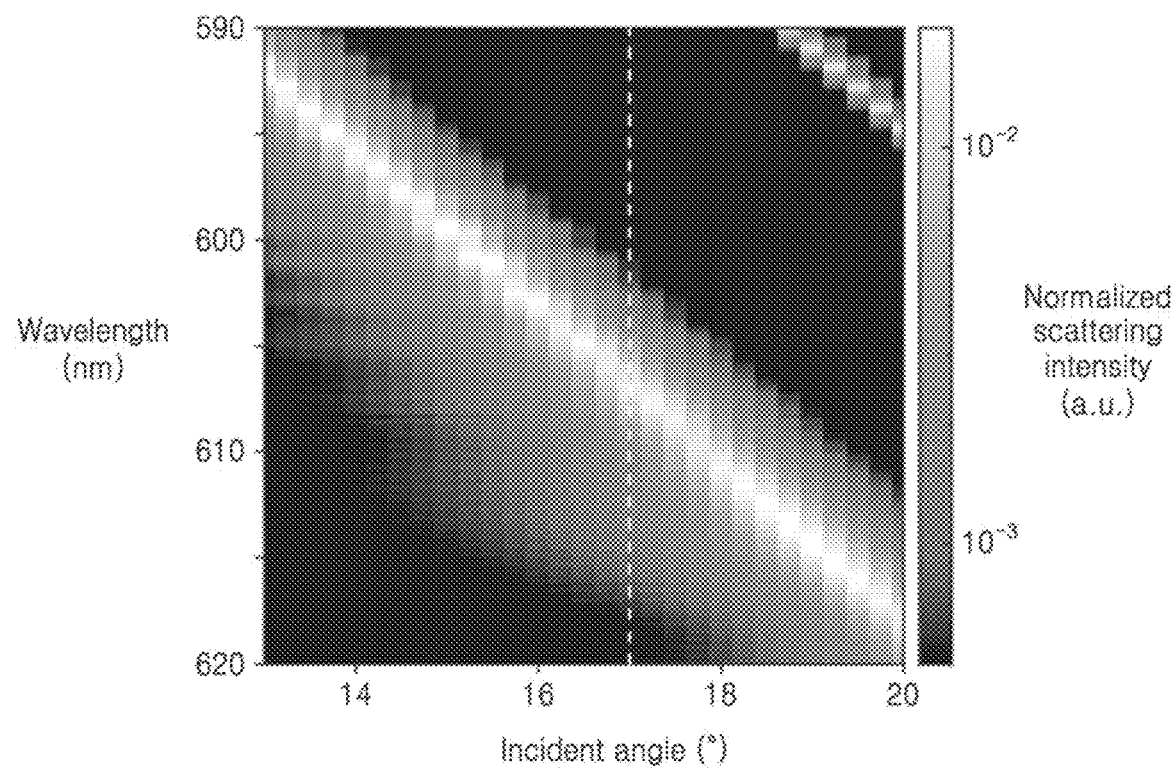
FIG. 10 is an enlarged graph of the secondary TM mode branch in the incident angle range of about 13 degrees to about 20 degrees and the wavelength band of about 590 nm to about 620 nm in FIG. 9A.
Figure 11A:
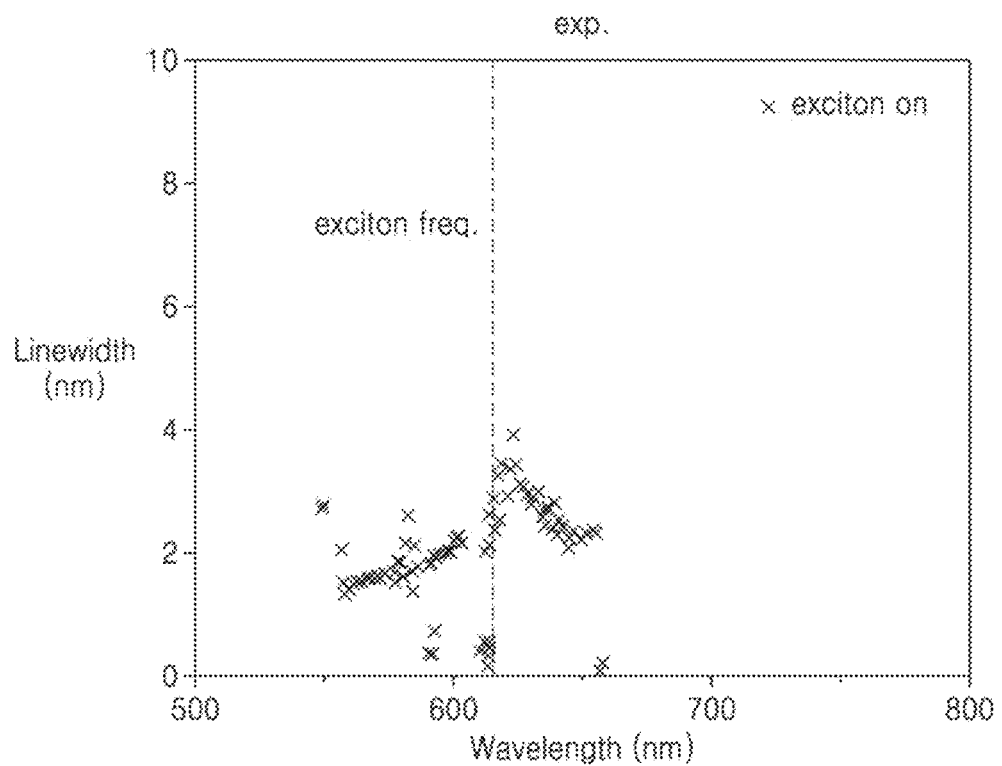
FIG. 11A is an experimental graph showing a change in linewidth with wavelength when a pump beam is not radiated.
Figure 11B:
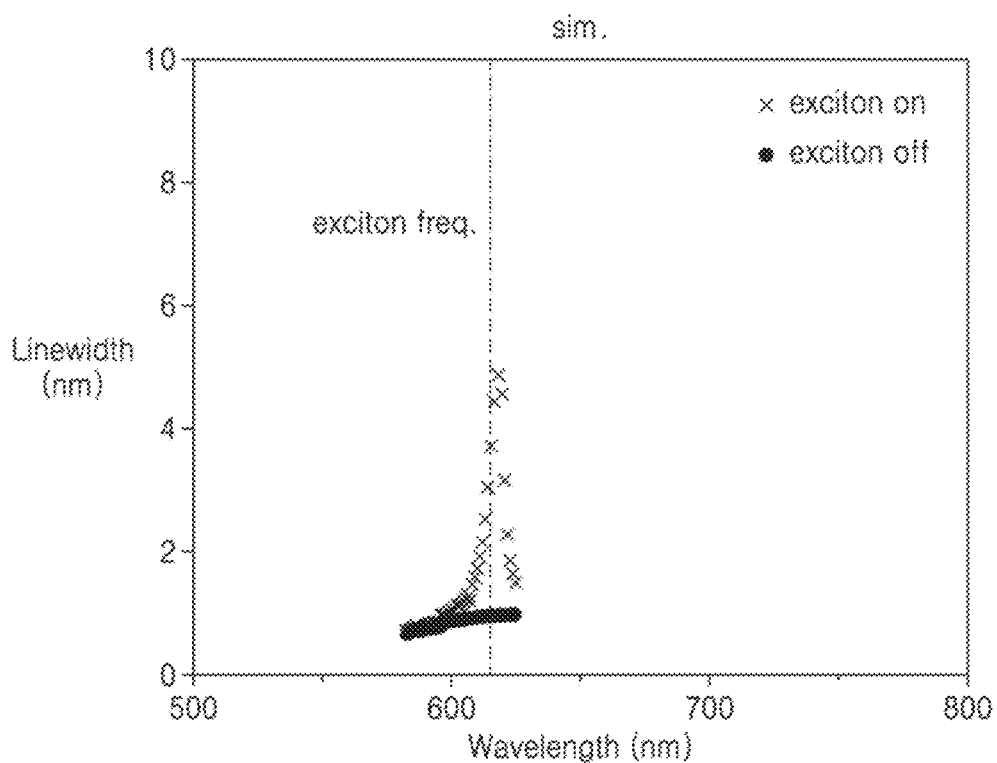
FIG. 11B is a simulation graph showing changes in linewidth with wavelength when a pump beam is radiated and when not radiated.

FIG. 10 is an enlarged graph of the secondary TM mode branch of the incident angle range of about 13 degrees to about 20 degrees and the wavelength band of about 590 nm to about 620 nm in FIG. 9A, FIG. 11A is an experimental graph showing the change in linewidth according to wavelength when the pump beam is not radiated, and FIG. 11B is a simulation graph showing changes in linewidth according to wavelength when a pump beam is radiated and when not radiated.

In FIG. 11A, each point may represent a linewidth value for light having different wavelengths and/or incident angles. According to FIGS. 10 to 11B, when the pump beam B1 is not radiated and the incident angle of the probe beam B2 is about 17 degrees, the secondary TM mode branch and the exciton absorption may overlap. Here, exciton absorption is possible, so that GMR and exciton absorption (exciton resonance) may occur together, and whether exciton absorption is possible or whether exciton absorption is inhibited may be controlled by stimulation through an active element AE. When exciton absorption is possible, the linewidth of the light absorption scattering peak may increase, and in this case, the linewidth of the scattering peak may be about 4 nm to about 6 nm. Absorption by exciton resonance may increase non-radiative decay. Conversely, when the pump beam B1 is radiated, exciton absorption is suppressed (exciton resonance is suppressed), and as confirmed in FIG. 2, light absorption at a predetermined wavelength may be reduced, and GMR may be more likely to occur. As exciton absorption is suppressed, linewidth may be lower than when exciton absorption is possible, and the rate of change of linewidth may be very low. For example, the linewidth of the scattering peak may be about 0.5 nm to about 1.5 nm. Accordingly, it is possible to implement the meta-optics 30 having a relatively high Q factor. The linewidth when the pump beam B1 is radiated may be less than the linewidth when the pump beam B1 is not radiated.

By using the light pumping structure as above, it is possible to implement an exciton absorption possible/inhibited state depending on whether the pump beam B1 is radiated, and through this, the optical properties, reflectance, or transmittance of the meta-optics 30 may be adjusted. The meta-optics 30 according to an example embodiment may be implemented as an active device by including a light pumping structure having a light source as an active element AE, and may provide a light modulator with a wide modulation range of light, relatively high-speed operation, and relatively high Q factor.

Figure 12:
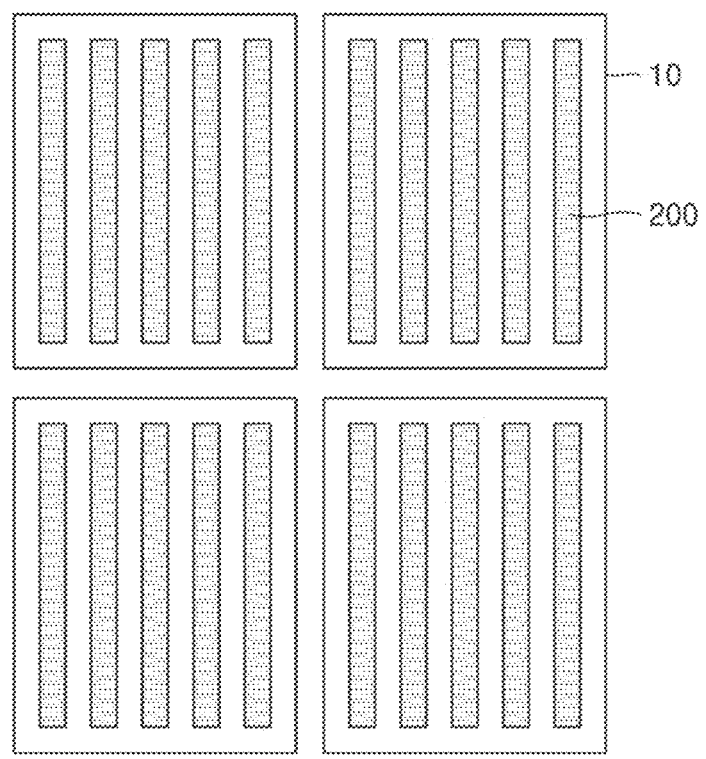
FIG. 12 is a plan view showing meta units arranged in 2D.

FIG. 12 is a plan view showing meta units arranged in 2D.

Referring to FIG. 12, when the meta unit 200 of the meta-optics 10 according to an example embodiment is one-dimensionally arranged, the light reflected in a direction (first direction) in which a plurality of meta units 200 are arranged may be modulated. When the meta unit 200 is two-dimensionally arranged, the light reflected in two directions (first direction and second direction) of the meta unit 200 may be modulated. In this case, the two directions may be perpendicular to each other, and the two directions may be perpendicular to the thickness direction of the meta-optics 10.

Figure 13:
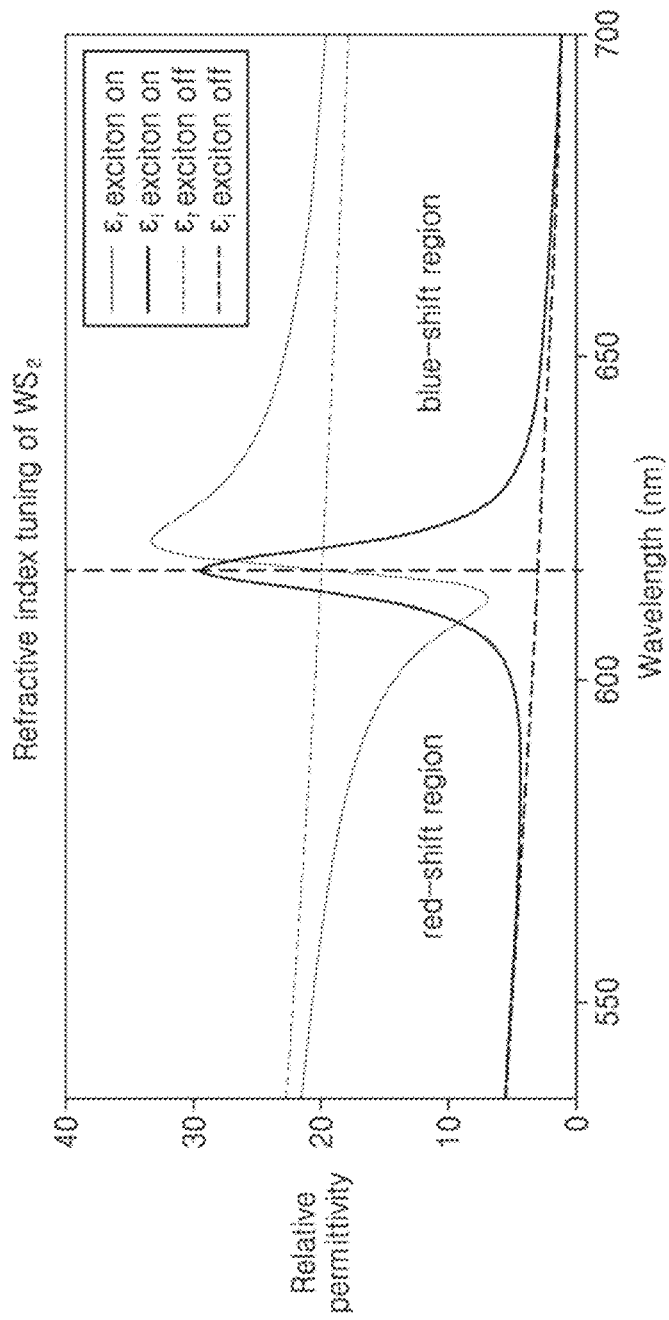
FIG. 13 is a graph showing the relative permittivity according to the wavelength of a grating including $WS_2$.

FIG. 13 is a graph showing the relative permittivity according to the wavelength of a grating including $WS_2$.

Referring to FIG. 13, the refractive index of the material included in the grating 210 may be changed by the exciton absorption enabled state or the exciton absorption inhibited state, and the resonance wavelength may be shifted according to the refractive index change. In a region (blue-shift region) having a wavelength greater than about 615 nm, which is the exciton resonance wavelength, the real part of the dielectric constant of the exciton absorption enabled state may be greater than the real part of the dielectric constant of the exciton absorption inhibited state. Therefore, in the blue-shift region, when exciton absorption is suppressed by applying a stimulus, the refractive index of the grating 210 including $WS_2$ may be lowered. As the refractive index decreases, the GMR wavelength may become smaller, that is, the resonance wavelength may be blue-shifted.

In a region (red-shift region) having a wavelength less than about 615 nm, which is the exciton resonance wavelength, the real part of the dielectric constant of the exciton absorption enabled state may be smaller than the real part of the dielectric constant of the exciton absorption inhibited state. Therefore, in the red-shift region, when exciton absorption is suppressed by applying a stimulus, the refractive index of the grating 210 including $WS_2$ may be increased. As the refractive index increases, the GMR wavelength may increase, that is, the resonance wavelength may be red-shifted.

Figure 14A:
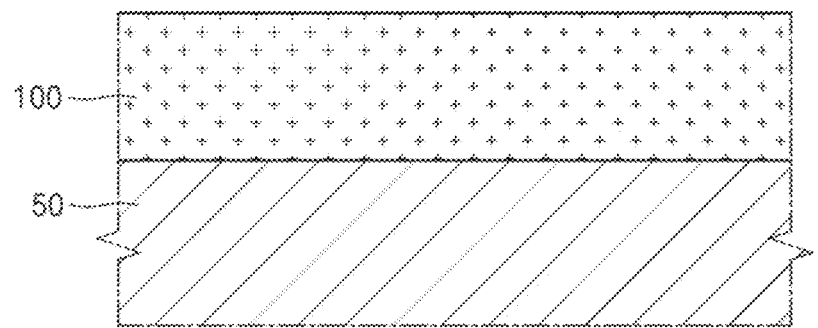
FIGS. 14A, 14B, 14C, 14D, and 14E are diagrams illustrating a method of manufacturing meta-optics according to an example embodiment.
Figure 14B:
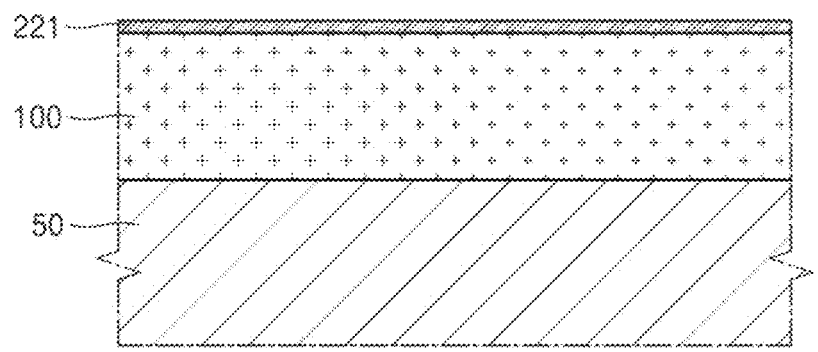
Figure 14C:
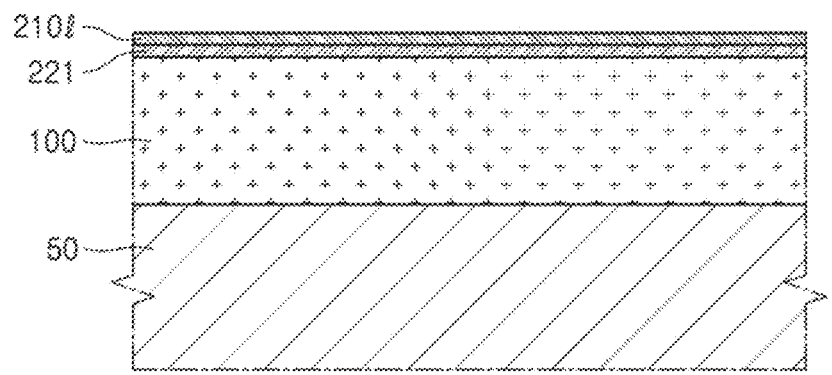
Figure 14D:
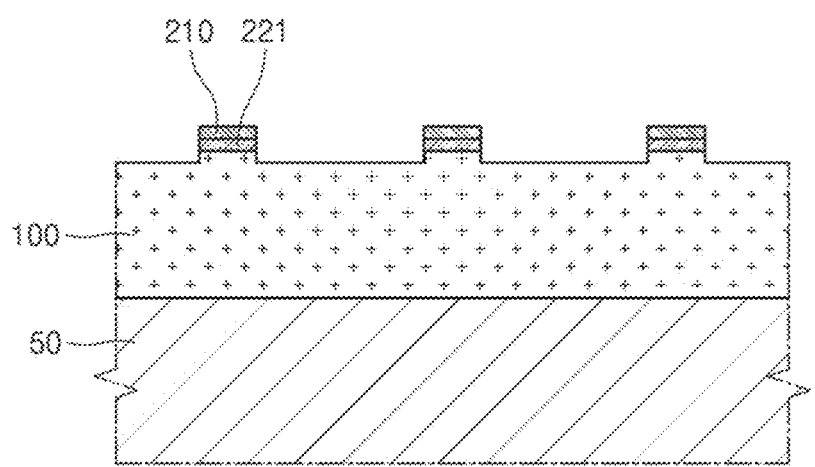
Figure 14E:
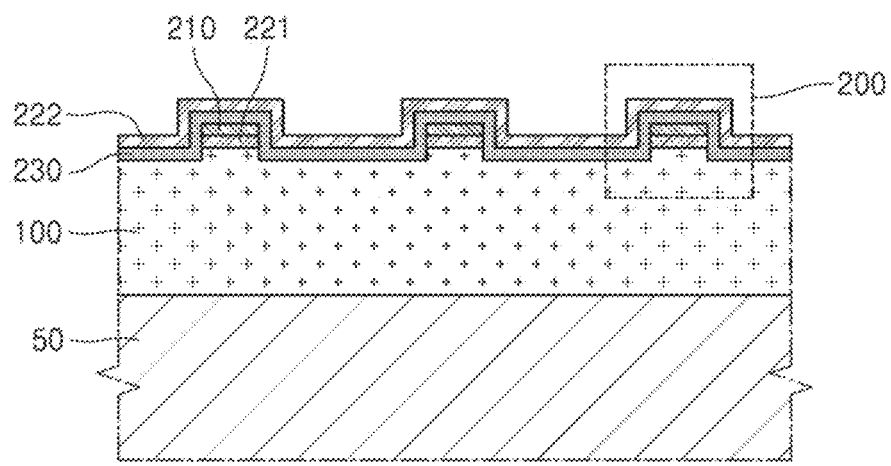
Figure 15:
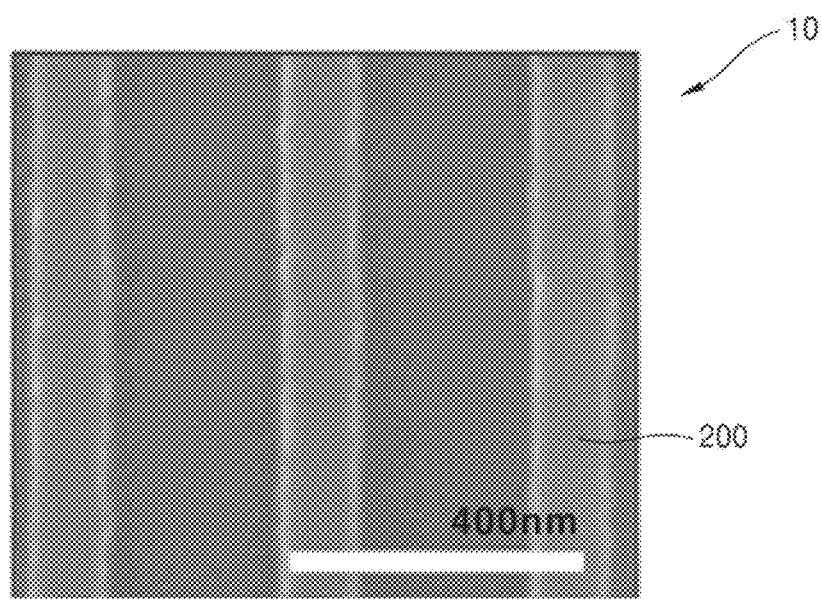
FIG. 15 is a photomicrograph showing a plan view of the manufactured meta-optics.

FIGS. 14A to 14E are views showing a method of manufacturing a meta-optics according to an example embodiment, and FIG. 15 is a photomicrograph showing a plan view of the manufactured meta-optics.

A method of manufacturing the meta-optics 10 according to an example embodiment may include depositing a waveguide layer 100 on a substrate 50, depositing a first electrode 221 on the waveguide layer 100, transferring a grating material layer 2101 including the grating material on the first electrode 221, patterning the grating material layer 2101 to form a grating structure, depositing a capping layer on the grating structure, and depositing a second electrode 222 on the capping layer.

According to FIG. 14A, the waveguide layer 100 may be deposited on the prepared substrate 50. The waveguide layer 100 may be deposited using at least one of several deposition methods, and for example, deposition methods such as Physical Vapor Deposition (PVD), Chemical Vapor Deposition (CVD), Plasma Enhanced Chemical Vapor Deposition (PECVD), and Atomic Layer Deposition (ALD) may be used.

Referring to FIG. 14B, the first electrode 221 may be deposited on the waveguide layer 100. The first electrode 221 may be deposited using at least one of several deposition methods, and the exemplary deposition method described above may be used.

According to FIG. 14C, the grating material layer 2101 may be transferred on the first electrode 221. The transfer may be performed by using at least one of several deposition methods, and the exemplary deposition method described above may be used. Or, the grating material layer 2201 may be formed by transferring the grating material from a precursor film having the grating material thereon. However, embodiments are not limited thereto, and various transfer methods may be used.

According to FIG. 14D, a grating structure including the grating 210 may be formed by patterning the grating material layer. Lithography, an etching technique, or the like may be used to pattern the grating material layer 2101. Lithography includes, for example, photolithography, and after a photomask is arranged, a proper pattern structure may be formed by emitting light in a direction perpendicular to the substrate 50. According to another example embodiment, the etching technique may include, for example, dry etching, wet etching, and reactive ion etching (RIE). A proper pattern structure may be formed by etching. However, embodiments are not limited to the example described above, and various patterning methods may be used to form a grating structure.

In the forming of the grating structure by patterning the grating structure, the grating material layer 2101 and the first electrode 221 in the region except for the portion where the grating 210 is formed may be removed. In addition, a portion of the waveguide layer 100 in an area excluding the portion where the grating 210 is formed may be removed. A grating structure in which a period A between each grating 210, a height t of each meta unit 200, and/or a width w of the meta unit 200 are/is constant may be formed. However, embodiments are not limited thereto, and one region may be formed so that at least one of the period A between the gratings 210, the height t of the meta unit 200, or the width w of the meta unit 200 is different.

Referring to FIG. 14E, the capping layer (dielectric layer 230) and the second electrode 222 may be sequentially deposited. The capping layer may be a layer including a dielectric, and may serve to electrically insulate the first electrode 221 and the second electrode 222. The capping layer and the second electrode 222 may be deposited using at least one of several deposition methods, and the exemplary deposition method described above may be used.

Through the exemplary method of manufacturing the meta-optics 10 of FIGS. 14A to 14E, the meta-optics 10 including a nanostructure as shown in FIG. 15 may be manufactured. Referring to FIG. 15, the period A of the manufactured meta-optics 10 may be about 300 nm to about 400 nm. However, the period A of the manufactured meta-optics 10 is not limited to the above range.

Figure 16:
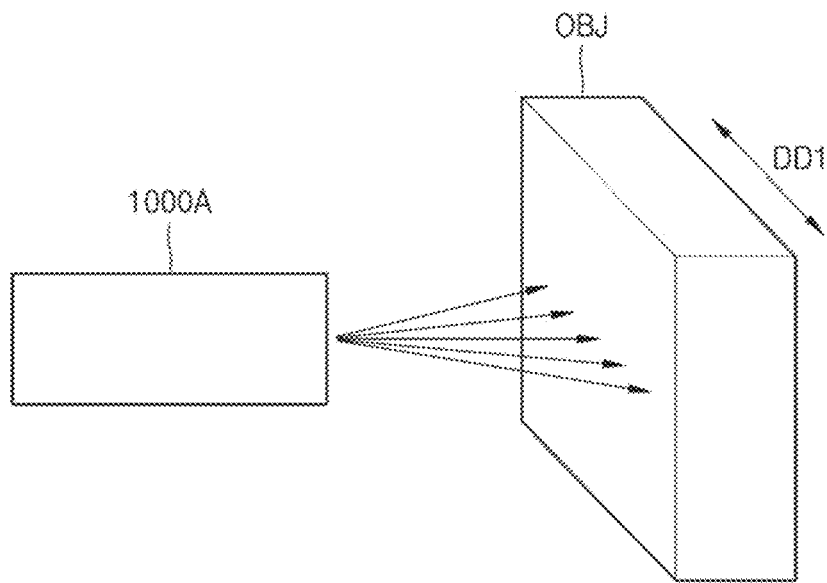
FIG. 16 is a conceptual diagram for explaining a beam steering device including meta-optics according to an example embodiment.

FIG. 16 is a conceptual diagram for explaining a beam steering device including a meta-optics according to an example embodiment.

Referring to FIG. 16, a beam may be steered in a one-dimensional direction using a beam steering device 1000A. That is, the beam may be steered toward the object OBJ in the first direction DD1. The beam steering device 1000A may include a one-dimensional array of a plurality of meta-optics 10 or 30 according to example embodiments.

Figure 17:
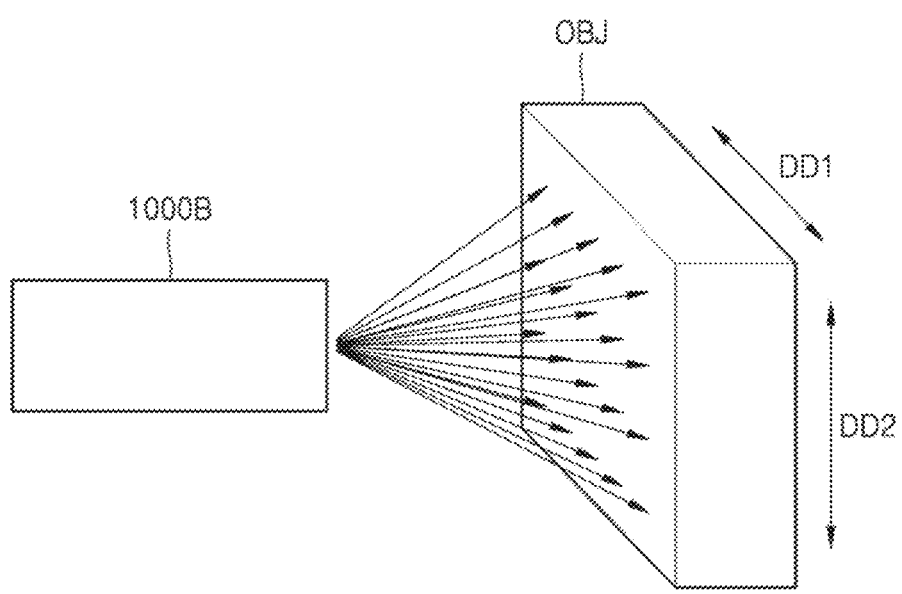
FIG. 17 is a conceptual diagram for explaining a beam steering device including meta-optics according to an example embodiment.

FIG. 17 is a conceptual diagram for explaining a beam steering device including a meta-optics according to an example embodiment.

Referring to FIG. 17, a beam may be steered in a two-dimensional direction using a beam steering device 1000B. That is, the beam may be steered toward the object OBJ in the first direction DD1 and the second direction DD2 perpendicular thereto. The beam steering device 1000B may include a two-dimensional array of a plurality of meta-optics 10 or 30 according to example embodiments. The beam steering devices 1000A and 1000B described with reference to FIGS. 16 and 17 may be non-mechanical beam scanning apparatuses.

Figure 18:
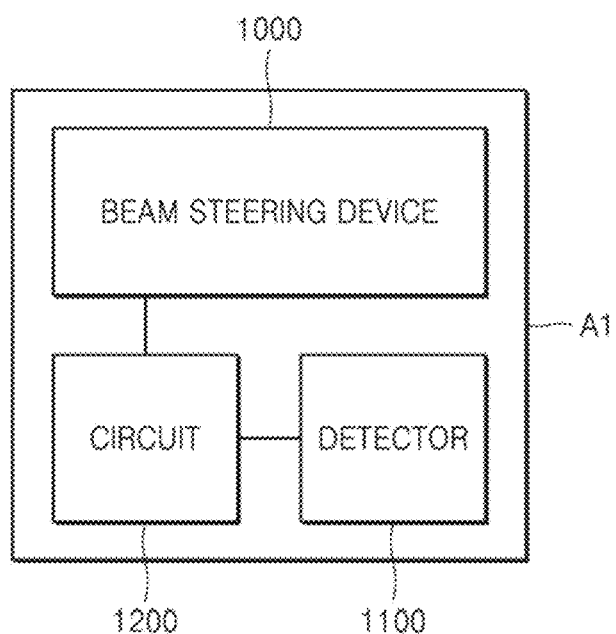
FIG. 18 is a block diagram illustrating an overall system of an electronic device including a beam steering element to which meta-optics is applied according to an example embodiment.

FIG. 18 is a block diagram illustrating an overall system of an electronic device including a beam steering device to which a meta-optics is applied according to an example embodiment.

Referring to FIG. 18, the electronic device A1 may include a beam steering device 1000. The beam steering device 1000 may include meta-optics 10 or 30 according to the example embodiments described with reference to FIGS. 1 to 15. The electronic device A1 may include a light source unit in the beam steering device 1000 or a light source unit provided separately from the beam steering device 1000. The electronic device A1 may include a detection unit 1100 for detecting light steered by the beam steering device 1000 reflected by an object (not shown). The detection unit 1100 may include a plurality of photodetection elements, and may further include other optical members. Also, the electronic device A1 may further include a circuit unit 1200 connected to at least one of the beam steering device 1000 and the detection unit 1100. The circuit unit 1200 may include an operation unit that obtains and calculates data, and may further include a driving unit and a control unit. Also, the circuit unit 1200 may further include a power supply unit, a memory, and the like.

FIG. 18 illustrates a case in which the electronic device A1 includes the beam steering device 1000 and the detection unit 1100 in one device, but the beam steering device 1000 and the detection unit 1100 may not be provided as a single device, but may be provided separately in separate devices. In addition, the circuit unit 1200 may be connected to the beam steering device 1000 or the detection unit 1100 by wire or wireless communication. In addition, the configuration of FIG. 18 may be variously changed.

The meta-optics 10 and 30 according to the above-described embodiment or a beam steering device including the same may be applied to various electronic devices. For example, the beam steering device may be applied to a Light Detection And Ranging (LiDAR) device. The LiDAR device may be a phase-shift device or a time-of-flight (TOF) device. In addition, the meta-optics 10 or 30 or a beam steering device including the same according to the embodiment may be mounted on electronic devices such as smartphones, wearable devices (such as augmented reality and virtual reality glasses-type devices), Internet of Things (IoT) devices, home appliances, tablet Personal Computers (PCs), Personal Digital Assistants (PDAs), portable multimedia players (PMPs), navigations, drones, robots, driverless vehicles, autonomous vehicles, Advanced Drivers Assistance Systems (ADAS), and the like.

Figure 19:
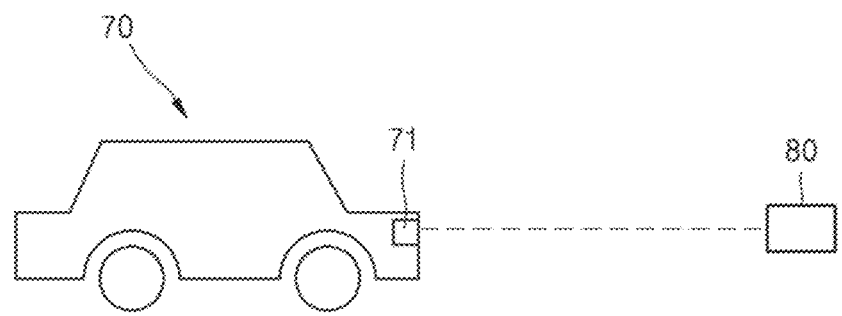
FIGS. 19 and 20 are conceptual side and top views illustrating a case in which a light ranging and detecting (LiDAR) device including meta-optics according to an example embodiment is applied to a vehicle.
Figure 20:
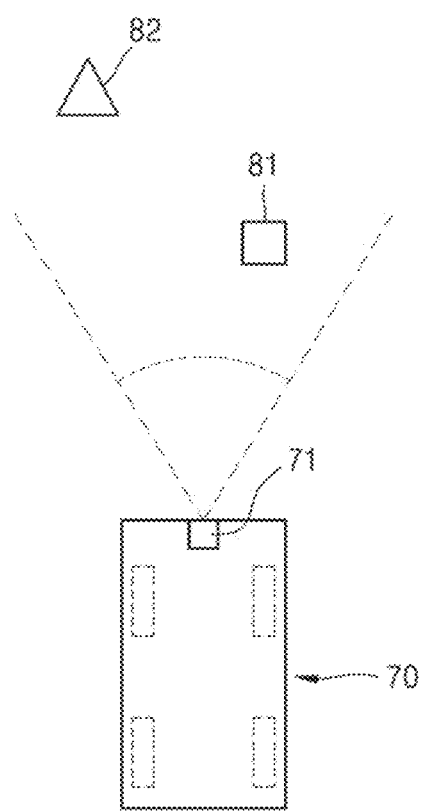

FIGS. 19 and 20 are conceptual views illustrating a case in which a LiDAR device including a meta-optics according to an example embodiment is applied to a vehicle. FIG. 19 is a view viewed from the side, and FIG. 20 is a view viewed from above.

Referring to FIG. 19, a LiDAR device 71 may be applied to a vehicle 70, and information on an object 80 may be obtained using this. The vehicle 70 may be a vehicle having an autonomous driving function. By using the LiDAR device 71, it is possible to detect an object or a person, that is, the object 80, in a direction in which the vehicle 70 is traveling. In addition, the distance to the object 80 may be measured using information such as a time difference between the transmission signal and the detection signal. Also, as shown in FIG. 20, information on a near object 81 and a far object 82 within a scan range may be acquired.

The meta-optics 10 and 30 according to various embodiments may be applied to various electronic devices other than LiDAR. For example, using the meta-optics 10 and 30 according to various embodiments, it is possible to obtain three-dimensional information of a space and an object through scanning, so that this may be applied to a three-dimensional image acquisition device or a three-dimensional camera. In addition, the meta-optics 10 and 30 may be applied to a holographic display device and a structured light generating device. In addition, the meta-optics 10 and 30 may be applied to various optical components/devices such as various beam scanning devices, hologram generating devices, light coupling devices, variable focus lenses, and depth sensors. In addition, the meta-optics 10 and 30 may be applied to various fields in which "metasurface" or "metastructure" is used. In addition, the meta-optics 10 and 30 according to the example embodiment and an electronic device including the same may be applied to various optics and electronic devices for various purposes.

Figure 21:
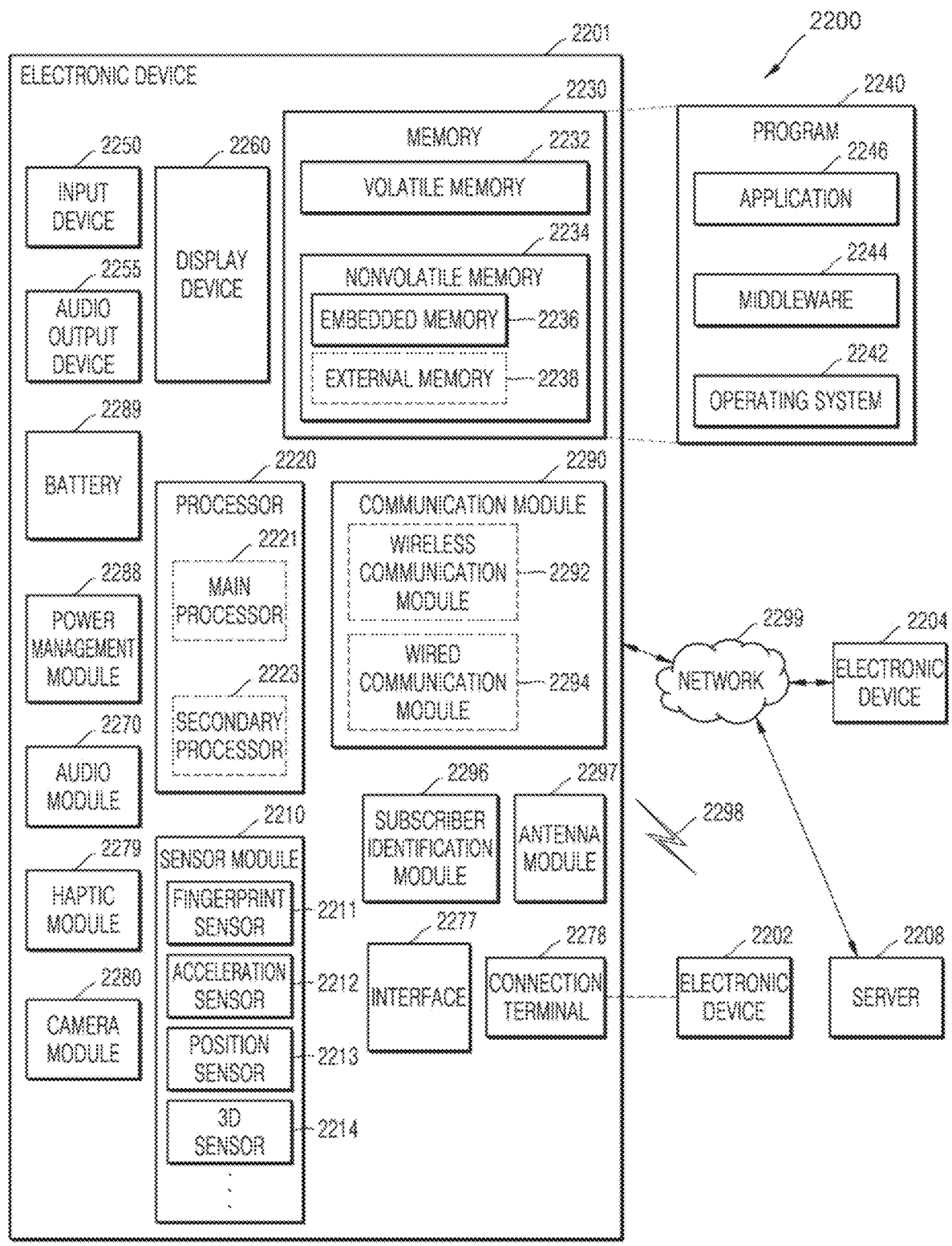
FIG. 21 is a block diagram showing a configuration of an electronic device according to an example embodiment.

FIG. 21 is a block diagram showing a configuration of an electronic device according to an example embodiment.

Referring to FIG. 21, in a network environment 2299, an electronic device 2201 may communicate with another electronic device 2202 through a first network 2298 (such as a short-range wireless communication network, and the like), or communicate with another electronic device 2204 and/or a server 2208 through a second network 2299 (such as a remote wireless communication network). The electronic device 2201 may communicate with the electronic device 2208 through the server 2204. The electronic device 2201 may include a processor 2220, a memory 2230, an input device 2250, an audio output device 2255, a display device 2260, an audio module 2270, a sensor module 2210, and an interface 2277, a haptic module 2279, a camera module 2280, a power management module 2288, a battery 2289, a communication module 2290, a subscriber identification module 2296, and/or an antenna module 2297. In the electronic device 2201, some of these components (such as the display device 2260) may be omitted or other components may be added. Some of these components may be implemented as one integrated circuit. For example, the fingerprint sensor 2211, an iris sensor, an illuminance sensor, or the like of the sensor module 2210 may be implemented by being embedded in the display device 2260 (such as a display, and the like).

The processor 2220 may execute software (the program 2240, etc.) to control one or a plurality of other components (such as hardware, software components, etc.) of the electronic device 2201 connected to the processor 2220, and perform various data processing or operations. As part of data processing or operation, the processor 2220 may load commands and/or data received from other components (the sensor module 2210, the communication module 2290, etc.) into the volatile memory 2232, process commands and/or data stored in the volatile memory 2232, and store result data in the nonvolatile memory 2234. The processor 2220 may include a main processor 2221 (such as a central processing unit, an application processor, etc.) and a secondary processor 2223 (such as a graphics processing unit, an image signal processor, a sensor hub processor, a communication processor, etc.) that may be operated independently or together.

The secondary processor 2223 may use less power than the main processor 2221 and may perform specialized functions.

The secondary processor 2223 may control functions and/or states related to some of the components of the electronic device 2201 (such as the display device 2260, the sensor module 2210, the communication module 2290, and the like) instead of the main processor 2221 while the main processor 2221 is in an inactive state (sleep state), or with the main processor 2221 while the main processor 2221 is in an active state (application execution state). The secondary processor 2223 (such as an image signal processor, a communication processor, etc.) may be implemented as part of other functionally related components (such as the camera module 2280, the communication module 2290, etc.).

The memory 2230 may store various data required by components of the electronic device 2201 (such as the processor 2220, the sensor module 2276, etc.). The data may include, for example, software (such as the program 2240, etc.) and input data and/or output data for commands related thereto. The memory 2230 may include a volatile memory 2232 and/or a nonvolatile memory 2234.

The program 2240 may be stored as software in the memory 2230 and may include an operating system 2242, a middleware 2244, and/or an application 2246.

The input device 2250 may receive commands and/or data to be used for components (such as the processor 2220, and the like) of the electronic device 2201 from outside (a user) of the electronic device 2201. The input device 2250 may include a microphone, a mouse, a keyboard, and/or a digital pen (such as a stylus pen).

The audio output device 2255 may output an audio signal to the outside of the electronic device 2201. The audio output device 2255 may include a speaker and/or a receiver. The speaker may be used for general purposes such as multimedia playback or recording playback, and the receiver may be used to receive incoming calls. The receiver may be combined as a part of the speaker or may be implemented as an independent separate device.

The display device 2260 may visually provide information to the outside of the electronic device 2201. The display device 2260 may include a display, a hologram device, or a projector and a control circuit for controlling the device. The display device 2260 may include a touch circuit set to sense a touch, and/or a sensor circuit (such as a pressure sensor) set to measure the strength of a force generated by the touch.

The audio module 2270 may convert sound into an electrical signal, or conversely, may convert an electrical signal into sound. The audio module 2270 may acquire sound through the input device 2250 or output sound through speakers and/or headphones of the audio output device 2255, and/or another electronic device (such as the electronic device 2102) directly or wirelessly connected to electronic device 2201.

The sensor module 2210 may detect an operating state (such as power, temperature, and the like) of the electronic device 2201 or an external environmental state (such as a user state, and the like), and generate an electrical signal and/or data value corresponding to the detected state. The sensor module 2210 may include a fingerprint sensor 2211, an acceleration sensor 2212, a position sensor 2213, a 3D sensor 2214, and the like, and in addition may include an iris sensor, a gyro sensor, an atmospheric pressure sensor, a magnetic sensor, a grip sensor, a proximity sensor, a color sensor, an infrared (IR) sensor, a biometric sensor, a temperature sensor, a humidity sensor, and/or an illuminance sensor.

The 3D sensor 2214 irradiates a preset light onto an object and analyzes the reflected light from the object to sense the shape and movement of the object and may include any one of the meta optics 10 and 30 according to the above-described embodiments.

The interface 2277 may support one or more specified protocols that may be used for the electronic device 2201 to connect directly or wirelessly with another electronic device (such as the electronic device 2102). The interface 2277 may include a High Definition Multimedia Interface (HDMI), a Universal Serial Bus (USB) interface, an SD card interface, and/or an audio interface.

The connection terminal 2278 may include a connector through which the electronic device 2201 may be physically connected to another electronic device (such as the electronic device 2202). The connection terminal 2278 may include an HDMI connector, a USB connector, an SD card connector, and/or an audio connector (such as a headphone connector).

The haptic module 2279 may convert an electrical signal into a mechanical stimulus (such as vibration, movement, etc.) or an electrical stimulus that a user may perceive through a tactile or motor sense. The haptic module 2279 may include a motor, a piezoelectric element, and/or an electrical stimulation device.

The camera module 2280 may capture a still image and a video. The camera module 2280 may include a lens assembly including one or more lenses, image sensors, image signal processors, and/or flashes. The lens assembly included in the camera module 2280 may collect light emitted from an object that is a target of image taking, and may include any one of the meta-optics 10 and 30 according to the above-described embodiments.

The power management module 2288 may manage power supplied to the electronic device 2201. The power management module 2288 may be implemented as a part of a Power Management Integrated Circuit (PMIC).

The battery 2289 may supply power to components of the electronic device 2201. The battery 2289 may include a non-rechargeable primary cell, a rechargeable secondary cell, and/or a fuel cell.

The communication module 2290 may support establishing a direct (wired) communication channel and/or a wireless communication channel, and performing communication through the established communication channel between the electronic device 2201 and other electronic devices (such as the electronic device 2202, the electronic device 2204, the server 2208, and the like). The communication module 2290 may include one or more communication processors that operate independently of the processor 2220 (such as an application processor) and support direct communication and/or wireless communication. The communication module 2290 may include a wireless communication module 2292 (such as a cellular communication module, a short-range wireless communication module, a Global Navigation Satellite System (GNSS) communication module, and the like) and/or a wired communication module 2294 (such as a local area network (LAN) communication module, a power line communication module, and the like). Among these communication modules, a corresponding communication module may communicate with other electronic devices through a first network 2298 (a short-range communication network such as Bluetooth, WiFi Direct, or Infrared Data Association (IrDA)) or a second network 2299 (a cellular network, the Internet, or a telecommunication network such as a computer network (such as LAN, WAN, and the like)). These various types of communication modules may be integrated into one component (such as a single chip, etc.), or may be implemented as a plurality of separate components (a plurality of chips). The wireless communication module 2292 may check and authenticate the electronic device 2201 in a communication network such as the first network 2298 and/or the second network 2299 using the subscriber information (such as international mobile subscriber identifier (IMSI), and the like) stored in the subscriber identification module 2296.

The antenna module 2297 may transmit signals and/or power to the outside (such as other electronic devices) or receive signals and/or power from the outside. The antenna may include a radiator made of a conductive pattern formed on a substrate (such as PCB, etc.). The antenna module 2297 may include one or a plurality of antennas. When multiple antennas are included, an antenna suitable for a communication method used in a communication network such as the first network 2298 and/or the second network 2299 may be selected from the plurality of antennas by the communication module 2290. Signals and/or power may be transmitted or received between the communication module 2290 and another electronic device through the selected antenna. In addition to the antenna, other components (such as RFIC) may be included as part of the antenna module 2297.

Some of the components are connected to each other and may exchange signals (such as commands, data, and the like) through communication method between peripheral devices (such as bus, General Purpose Input and Output (GPIO), Serial Peripheral Interface (SPI), Mobile Industry Processor Interface (MIPI), and the like)

The command or data may be transmitted or received between the electronic device 2201 and the external electronic device 2204 through the server 2208 connected to the second network 2299. The other electronic devices 2202 and 2204 may be the same or different types of devices as or from the electronic device 2201. All or some of the operations executed by the electronic device 2201 may be executed by one or more of the other electronic devices 2202 and 2204, and the server 2208. For example, when the electronic device 2201 needs to perform a certain function or service, instead of executing the function or service itself, the electronic device 8201 may request one or more other electronic devices to perform the function or part or all of the service. One or more other electronic devices that receive the request may execute an additional function or service related to the request, and transmit a result of the execution to the electronic device 2201. For this, cloud computing, distributed computing, and/or client-server computing technology may be used.

Figure 22:
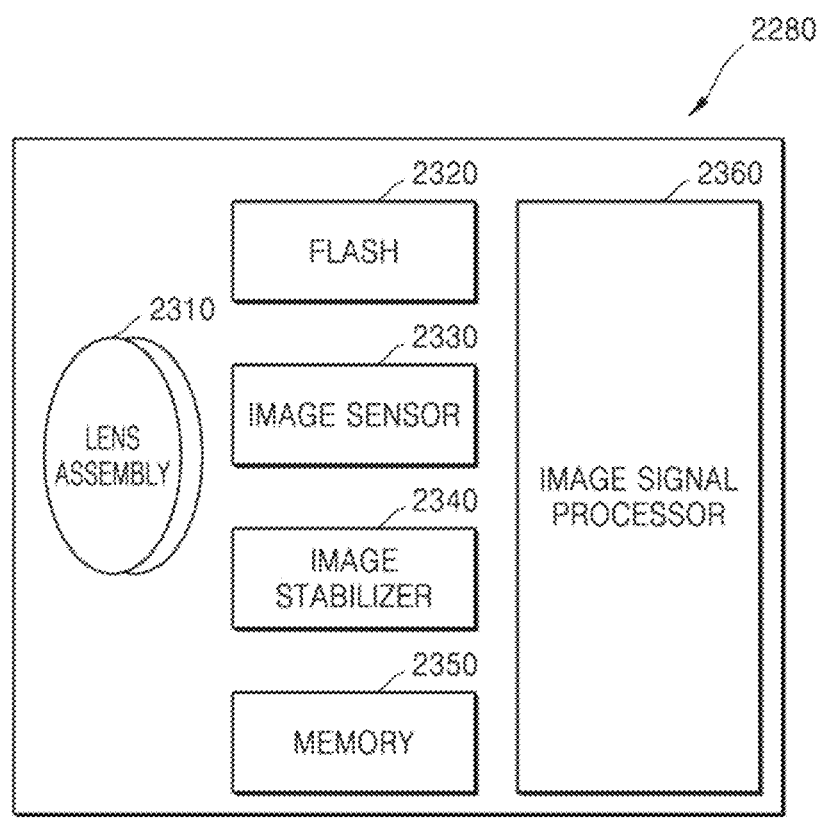
FIG. 22 is a block diagram illustrating a configuration of a camera module included in the electronic device of FIG. 21.

FIG. 22 is a block diagram illustrating a configuration of a camera module included in the electronic device of FIG. 21.

Referring to FIG. 22, the camera module 2280 may include a lens assembly 2310, a flash 2320, an image sensor 2330, an image stabilizer 2340, a memory 2350 (buffer memory, etc.), and/or an image signal processor 2360. The lens assembly 2310 may collect light emitted from an object to be imaged, and may include any one of the above-mentioned meta-optics 10 and 30. The lens assembly 2310 may include one or more refractive lenses and a light modulator. The light modulator provided therein may be designed as a lens having a predetermined phase profile and a compensation structure to reduce phase discontinuity. The lens assembly 2310 having such a light modulator realizes proper optical performance and may have a short optical length.

In addition, the camera module 2280 may further include an actuator. For example, the actuator may drive lens elements constituting the lens assembly 2310 to adjust positions thereof and a separation distance between the lens elements during a zooming and/or autofocus (AF).

The camera module 2280 may include a plurality of lens assemblies 2310, and in this case, the camera module 2280 may be a dual camera, a 360 degree camera, or a spherical camera. Some of the plurality of lens assemblies 2310 may have the same lens properties (such as angle of view, focal length, auto focus, F number, optical zoom, and the like), or may have different lens properties. The lens assembly 2310 may include a wide-angle lens or a telephoto lens.

The flash 2320 may emit light used to enhance light emitted or reflected from an object. The flash 2320 may include one or more light emitting diodes (such as Red-Green-Blue (RGB)) LED, White LED, Infrared LED, Ultraviolet LED, and the like), and/or a Xenon Lamp. The image sensor 2330 may acquire an image corresponding to the object by converting light emitted or reflected from the object and transmitted through the lens assembly 2310 into an electrical signal. The image sensor 2330 may include one or a plurality of sensors selected from image sensors having different properties such as an RGB sensor, a black and white (BW) sensor, an IR sensor, or a UV sensor. Each of the sensors included in the image sensor 2330 may be implemented as a charged coupled device (CCD) sensor and/or a complementary metal oxide semiconductor (CMOS) sensor.

In response to the movement of the camera module 2280 or the electronic device 2201 including the camera module 2280, the image stabilizer 2340 may move one or a plurality of lenses, included in the lens assembly 2310, or the image sensor 2330 in a certain direction or control (e.g., adjusting a read-out timing) the operating characteristics of the image sensor 2330 to thereby compensate for a negative effect of the movement. The image stabilizer 2340 may detect movement of the camera module 2280 or the electronic device 2201 using a gyro sensor (not shown) or an acceleration sensor (not shown) arranged inside or outside the camera module 2280. The image stabilizer 2340 may be implemented optically.

The memory 2350 may store some or all data of an image acquired through the image sensor 2330 for a next image processing operation. For example, when a plurality of images are acquired at a relatively high speed, the acquired original data (such as Bayer-Patterned data, high resolution data, and the like) is stored in the memory 2350, and after displaying only low-resolution images, it may be used to transmit the original data of the selected image (such as user selection) to the image signal processor 2360. The memory 2350 may be integrated into the memory 2230 of the electronic device 2201 or may be configured as a separate memory operated independently.

The image signal processor 2360 may perform one or more image processing on an image acquired through the image sensor 2330 or image data stored in the memory 2350. One or more image processing may include depth map generation, three-dimensional modeling, panorama generation, feature point extraction, image synthesis, and/or image compensation (such as noise reduction, resolution adjustment, brightness adjustment, blurring, sharpening, softening, and the like). The image signal processor 2360 may perform control (such as exposure time control, read-out timing control, and the like) of components (such as the image sensor 2330) included in the camera module 2280. The image processed by the image signal processor 2360 may be stored again in the memory 2350 for further processing or may be provided to an external component of the camera module 2280 (such as the memory 2230, the display device 2260, the electronic device 2202, the electronic device 2204, the server 2208, and the like). The image signal processor 2360 may be integrated into the processor 2220 or may be configured as a separate processor operated independently from the processor 2220. When the image signal processor 2360 is configured as a processor separate from the processor 2220, the image processed by the image signal processor 2360 may be displayed through the display device 2260 after additional image processing by the processor 2220.

The electronic device 2201 may include a plurality of camera modules 2280 each having different properties or functions. In this case, one of the plurality of camera modules 2280 may be a wide-angle camera, and the other may be a telephoto camera. Similarly, one of the plurality of camera modules 2280 may be a front camera, and the other may be a rear camera.

Figure 23:
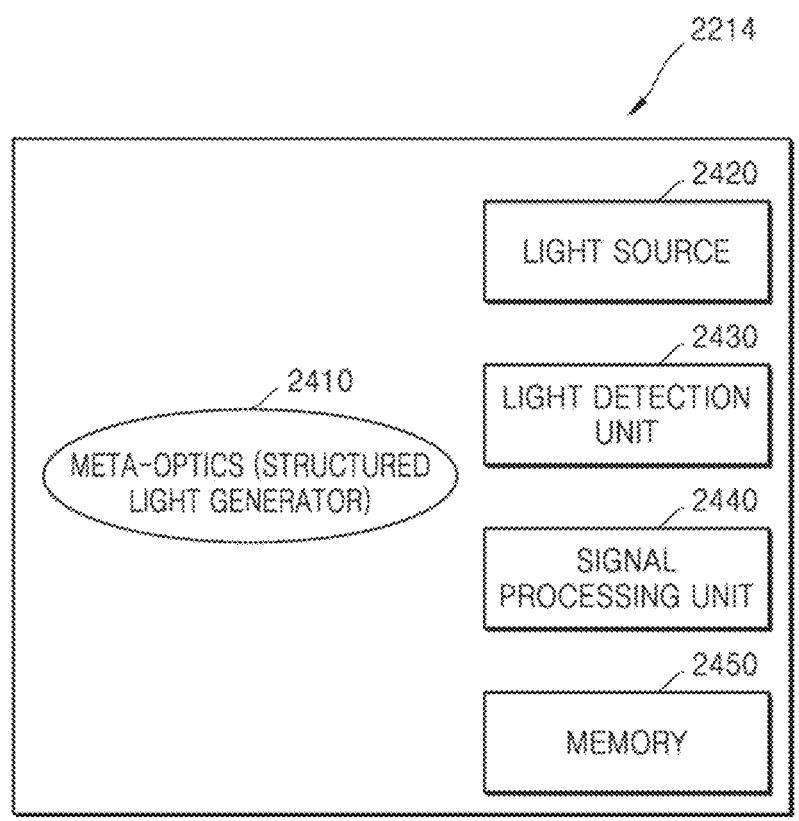
FIG. 23 is a block diagram illustrating a configuration of a 3D sensor included in the electronic device of FIG. 21.

FIG. 23 is a block diagram illustrating a configuration of a 3D sensor included in the electronic device of FIG. 21.

The 3D sensor 2214 senses the shape, movement, and the like of the object by irradiating a preset light to the object and receiving and analyzing the light reflected from the object. The 3D sensor 2214 includes a light source 2420, a meta-optics 2410, a light detection unit 2430, a signal processing unit 2440, and a memory 2450. As the meta-optics 2410, any one of the meta-optics 10 and 30 according to the above-described embodiments may be employed, and a target phase delay profile may be set to function as a beam deflector or a beam shaper.

The light source 2420 irradiates light to be used to analyze the shape or position of the object. The light source 2420 may include a light source that generates and irradiates light of a small wavelength. The light source 2420 may include a light source, for example, a laser diode (LD), a light emitting diode (LED), a super luminescent diode (SLD), and the like, that generates and irradiates light of a wavelength band suitable for analysis of a position and shape of an object, for example, light of a wavelength of an infrared band. The light source 2420 may be a tunable laser diode. The light source 2420 may generate and irradiate light of a plurality of different wavelength bands. The light source 2420 may generate and irradiate pulsed light or continuous light.

The meta-optics 2410 modulates the light radiated from the light source 2420 and transmits the modulated light to the object. When the meta-optics 2410 is a beam deflector, the meta-optics 2410 may deflect incident light in a preset direction to direct the deflected light toward the object. When the meta-optics 2410 is a beam shaper, the meta-optics 2410 modulates the incident light to have a distribution having a preset pattern. The meta-optics 2410 may form structured light suitable for 3D shape analysis.

As described above, the meta-optics 2410 may set the phase delay variance ($\partial \varphi / \partial \lambda$) to 0 or a positive or negative number, and implement a continuous phase delay profile. Accordingly, it is possible to perform achromatic light modulation according to wavelength. According to another example embodiment, the deflection direction may be changed for each wavelength by enhancing the deviation according to the wavelength, or a different beam pattern may be formed for each wavelength and radiated to the object.

The light detection unit 2430 receives the reflected light of the light radiated to the object through the meta-optics 2410. The light detection unit 24430 may include an array of a plurality of sensors for sensing light or may consist of only one sensor.

The signal processing unit 2440 may process the signal sensed by the light detection unit 2430 to analyze the shape of the object. The signal processing unit 2440 may analyze a 3D shape including the depth position of the object.

For the 3D shape analysis, an operation for measuring the optical time of flight may be performed. Various calculation methods may be used to measure the optical time of flight. For example, in the direct time measurement method, the distance is obtained by projecting pulsed light onto an object and measuring the time the light returns after being reflected by the object with a timer. In the correlation method, a pulsed light is projected onto an object and a distance is measured from the brightness of the reflected light reflected from the object. The phase delay measurement method is a method of projecting continuous wave light, such as a sine wave, onto an object, detecting the phase difference of the reflected light and converting the detected phase difference into a distance.

When structured light is radiated to the object, the depth position of the object may be calculated from a pattern change of the structured light reflected from the object, that is, a result of comparison with the incident structured light pattern. It is possible to extract the depth information of the object by tracking the pattern change for each coordinate of the structured light reflected from the object, and from this, 3D information related to the shape and movement of the object may be extracted.

The memory 2450 may store programs and other data necessary for the operation of the signal processing unit 2440.

The operation result of the signal processing unit 2440, that is, information on the shape and position of the object, may be transmitted to another unit in the electronic device 2201 or to another electronic device. For example, this information may be used by the application 2246 stored in the memory 2230. Another electronic device to which the result is transmitted may be a display device or a printer that outputs the result. In addition, the electronic device may include autonomous driving devices such as unmanned vehicles, autonomous vehicles, robots, and drones, smart phones, smart watches, mobile phones, personal digital assistants (PDAs), laptops, PCs, various wearable devices, other mobile or non-mobile computing devices, and Internet of Things devices.

Figure 24:
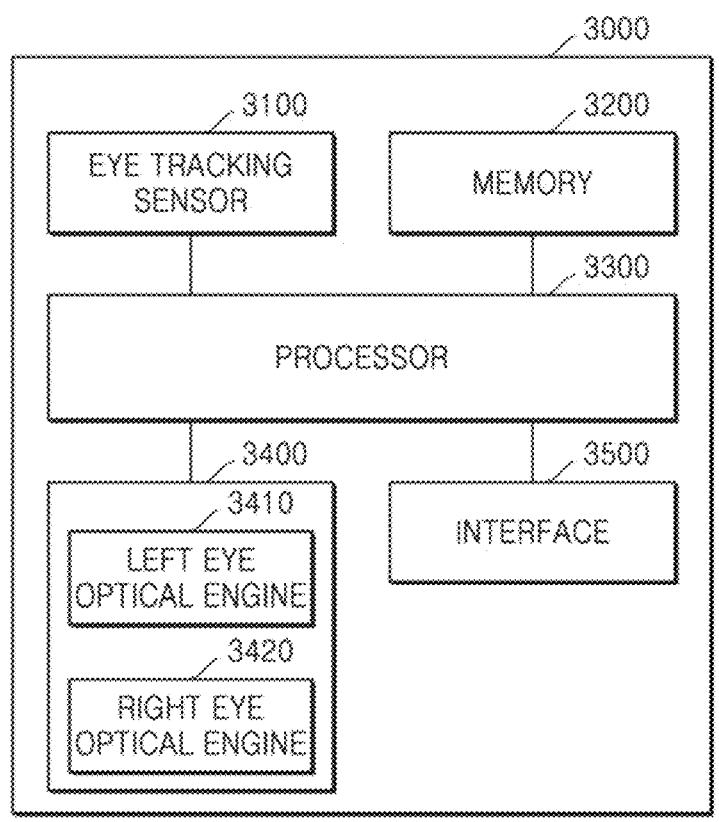
FIG. 24 is a block diagram showing a configuration of an electronic device according to an example embodiment.

FIG. 24 is a block diagram showing a configuration of an electronic device according to an example embodiment.

The electronic device 3000 of FIG. 24 may be a glasses-type augmented reality (AR) device. The electronic device 3000 includes a display engine 3400, a processor 3300, an eye tracking sensor 3100, an interface 3500, and a memory 3220.

The processor 3300 may control the overall operation of the augmented reality device including the display engine 3400 by driving an operating system or an application program, and may perform various data processing and operations including image data. For example, the processor 3300 may process image data including a left-eye virtual image and a right-eye virtual image rendered to have binocular disparity.

The interface 3500 is an input/output of data or operation commands from the outside, and may include, for example, a user interface such as a touch pad, a controller, and an operation button that a user may operate. The interface 3500 includes a wired communication module, such as a USB module, or a wireless communication module, such as Bluetooth, and through these, may receive user manipulation information or virtual image data transmitted from an interface included in the external device.

The memory 3200 may include an embedded memory such as a volatile memory or a non-volatile memory. The memory 3200 may store various data, programs, or applications for driving and controlling the augmented reality device under the control of the processor 3300, input/output signals, or data of virtual images.

The display engine 3400 is configured to receive the image data generated by the processor 3300 and generate the light of the virtual image, and includes a left eye optical engine 3410 and a right eye optical engine 3420. Each of the left eye optical engine 3410 and the right eye optical engine 3420 includes a light source that outputs light and a display panel that forms a virtual image using the light output from the light source, and has a function like a small projector. The light source may be implemented as, for example, an LED, and the display panel may be implemented as, for example, Liquid Crystal on Silicon (LCoS).

The eye tracking sensor 3100 may be mounted at a position where the pupil of the user wearing the augmented reality device may be tracked, and may transmit a signal corresponding to the user's gaze information to the processor 3100. Such an eye tracking sensor 3100 may detect gaze information such as a gaze direction toward which the user's eyes are directed, a pupil position of the user's eyes, or coordinates of a center point of the pupil. The processor 3300 may determine an eye movement type based on the user's gaze information detected by the eye tracking sensor 3100. For example, the processor 3300 may determine various types of gaze movements including fixation of looking at one point, pursuit of following a moving object, and saccade of rapidly moving the gaze from one point of gaze to another, based on the gaze information obtained from the eye tracking sensor.

Figure 25:
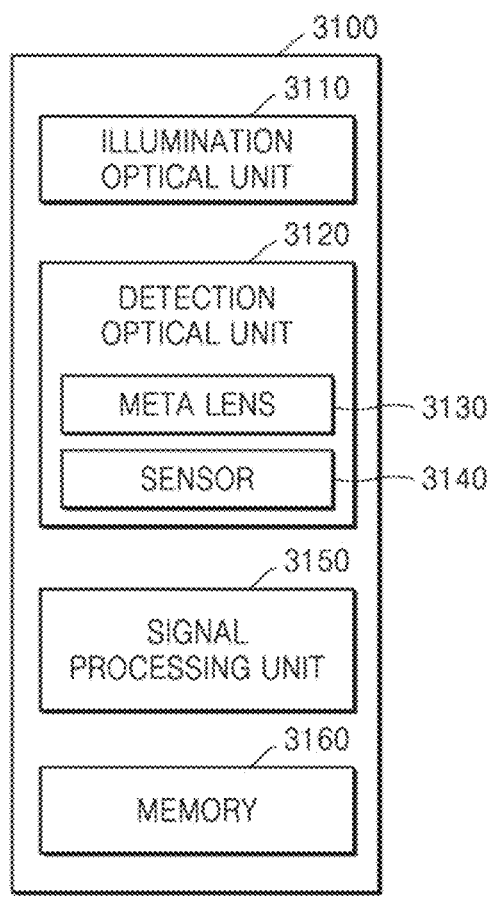
FIG. 25 is a block diagram showing a configuration of an eye tracking sensor provided in the electronic device of FIG. 24.

FIG. 25 is a block diagram showing a configuration of an eye tracking sensor provided in the electronic device of FIG. 24.

The eye tracking sensor 3100 includes an illumination optical unit 3110, a detection optical unit 3120, a signal processing unit 3150, and a memory 3160. The illumination optical unit 3110 may include a light source that irradiates light, for example, infrared light, to a location of an object (user's eye). The detection optical unit 3150 detects reflected light, and may include a meta lens 3130 and a sensor unit 3140. The signal processing unit 3150 calculates the pupil position of the user's eye from the result sensed by the detection optical unit 3120.

As the meta lens 3130, any one, combination, or modified example of the meta-optics 10 and 30 according to the above-described embodiments may be used. The meta lens 3130 may focus the light from the object on the sensor unit 3140. In the eye tracking sensor 3100 positioned very close to the user's eye, the incident angle of the light incident on the sensor unit 3140 may be, for example, about 30 degrees or more. The meta lens 3130 has a structure including a compensation area, and the efficiency degradation is reduced even for light having a large incident angle. Accordingly, the accuracy of eye tracking may be increased.

Glasses-type devices are used not only as glasses-type augmented reality (AR) devices but also as glasses-type virtual reality (VR) devices, and thus, may track a user's gaze on a VR image provided from a device.

A meta-optics according to an example embodiment may provide meta-optics having a relatively high Q factor using graphene, transition metal dichalcogenide (TMDc), or a two-dimensional material.

A meta-optics according to an example embodiment may provide meta-optics having a large change in the characteristics of the grating, for example, the reflectance or transmittance of the grating, by an external stimulus through the active structure.

A meta-optics according to the example embodiment have a wide modulation range of light and may provide meta-optics configured to operate at a relatively high speed.

The meta-optics manufacturing method according to an example embodiment may manufacture meta-optics including an active element.

It should be understood that example embodiments described herein should be considered in a descriptive sense only and not for purposes of limitation. Descriptions of features or aspects within each example embodiment should typically be considered as available for other similar features or aspects in other embodiments.

While example embodiments have been described with reference to the figures, it will be understood by those of ordinary skill in the art that various changes in form and details may be made therein without departing from the spirit and scope as defined by the following claims and their equivalents.

What is claimed is:

1. A meta-optics comprising:
   a waveguide layer comprising a first surface and a second surface opposite to the first surface; and
   a plurality of meta units provided on the waveguide layer, each meta unit of the plurality of meta units comprising a grating configured to diffract incident light of a predetermined wavelength, a first electrode provided under the grating, a dielectric layer provided over the grating, and a second electrode provided on the dielectric layer,
   wherein a dielectric constant of the grating and a reflectance of the grating with respect to incident light change based on a voltage applied to the first electrode and the second electrode,
   wherein the gratings of the plurality of meta units are spaced apart from each other in a first direction, and
   wherein the waveguide layer is configured such that the light diffracted by the grating is reflected between the first surface and the second surface to cause guided mode resonance toward the first direction in which the grating is arranged.

2. The meta-optics of claim 1, wherein a permittivity of the grating changes based on a change in an exciton density of the grating, and
   wherein the voltage has a magnitude that generates an exciton resonance of the grating.

3. The meta-optics of claim 1, wherein the plurality of meta units are arranged in the first direction and in a second direction perpendicular to the first direction.

4. The meta-optics of claim 1, wherein the light comprises light of a first wavelength that is an exciton absorption wavelength of a material included in the grating and a guided mode resonance wavelength, and
   wherein a period of the grating is less than the first wavelength to block a high order mode diffraction.

5. The meta-optics of claim 4, wherein the guided mode resonance wavelength is blue-shifted based on light of a second wavelength that is greater than the first wavelength being incident, and
   wherein the guided mode resonance wavelength is red-shifted based on light of a third wavelength that is less than the first wavelength being incident.

6. The meta-optics of claim 1, wherein the grating comprises at least one of graphene, transition metal dichalcogenide (TMDc), and a two-dimensional semiconductor material, and
   wherein a wavelength of the light is about 10 nm to about 3,000 μm.

7. The meta-optics of claim 1, wherein the grating comprises tungsten disulfide ($WS_2$), and
   wherein a wavelength of the light is about 600 nm to about 630 nm.

8. The meta-optics of claim 1, wherein a voltage is independently applied to each meta unit of the plurality of meta units through the first electrode and the second electrode of each meta unit of the plurality of meta units.

9. The meta-optics of claim 8, wherein at least one of a reflectance of the incident light and a transmittance of the incident light in a case where a voltage is applied is different by about 20% or more from a reflectance of the incident light and a transmittance of the incident light, respectively, in a case where a voltage is not applied.

10. The meta-optics of claim 1, wherein a Q factor of the meta-optics is at least 100.

11. The meta-optics of claim 1, wherein the first electrode or the second electrode comprises at least one of indium tin oxide (ITO), aluminum zinc oxide (AZO), indium zinc oxide (IZO), and indium gallium zinc oxide (IGZO), and
    wherein the waveguide layer comprises at least one of silicon oxide ($SiO_2$), hafnium oxide ($HfO_2$), titanium oxide ($TiO_2$), and aluminum oxide ($Al_2O_3$).

12. The meta-optics of claim 1, wherein the second electrode of a meta unit among the plurality of meta units is provided adjacent to an upper surface and a side surface of the grating included in the meta unit and extends along the waveguide layer.

13. The meta-optics of claim 1, wherein the waveguide layer is in a form of at least one of a slab, a ridge, a channel, a strip-loaded, a buried, or a photonic crystal.

14. The meta-optics of claim 1, wherein the meta-optics is electrically tunable.

15. A meta-optics comprising:
    a waveguide layer; and
    a plurality of meta units provided on the waveguide layer, each meta unit of the plurality of meta units comprising a grating that comprises a two-dimensional material, and an active element configured to apply a stimulus to the grating,
    wherein the gratings of the plurality of meta units are spaced apart from each other, and
    wherein a dielectric constant of the grating and a reflectance of the grating with respect to the incident light change based on the stimulus applied by the active element to the grating,
    wherein the active element is configured to generate an exciton resonance in the two-dimensional material, and
    wherein the active element comprises at least one of an electrical gating structure, an optical stimulation structure, a chemical reaction structure, a magnetic field application structure, a heating structure, or a mechanical deformation structure.

16. The meta-optics of claim 15, wherein the plurality of meta units are respectively configured to receive the stimulus independently by the active element included in each of the plurality of meta units.

17. The meta-optics of claim 15, wherein at least one of a reflectance of the light or a transmittance of the light changes by about 20% or more based on the active element being stimulated, and wherein a Q factor of the meta-optics is at least 100.

18. An electronic device comprising:

a meta-optics comprising:

a waveguide layer comprising a first surface and a second surface opposite to the first surface; and a plurality of meta units provided on the waveguide layer, each meta unit of the plurality of meta units comprising a grating configured to diffract incident light of a predetermined wavelength, a first electrode provided under the grating, a dielectric layer provided over the grating, and a second electrode provided on the dielectric layer, wherein a dielectric constant of the grating and a reflectance of the grating with respect to incident light change based on a voltage applied to the first electrode and the second electrode, wherein the gratings of the plurality of meta units are spaced apart from each other in a first direction, and wherein the waveguide layer is configured such that the light diffracted by the grating is reflected between the first surface and the second surface to cause guided mode resonance toward the first direction in which the grating is arranged.

19. The meta-optics of claim 1, wherein the dielectric layer of a meta unit among the plurality of meta units contacts an upper surface and a side surface of the grating included in the meta unit, and the second electrode included in the meta unit contacts an upper surface and a side surface of the dielectric layer included in the meta unit.

* * * * *